May 13, 1969     L. R. BREESE     3,444,521
SUPERVISORY CONTROL SYSTEM COMBINING SCANNING AND DIRECT
SELECTION MODES OF OPERATION
Filed Dec. 23, 1965
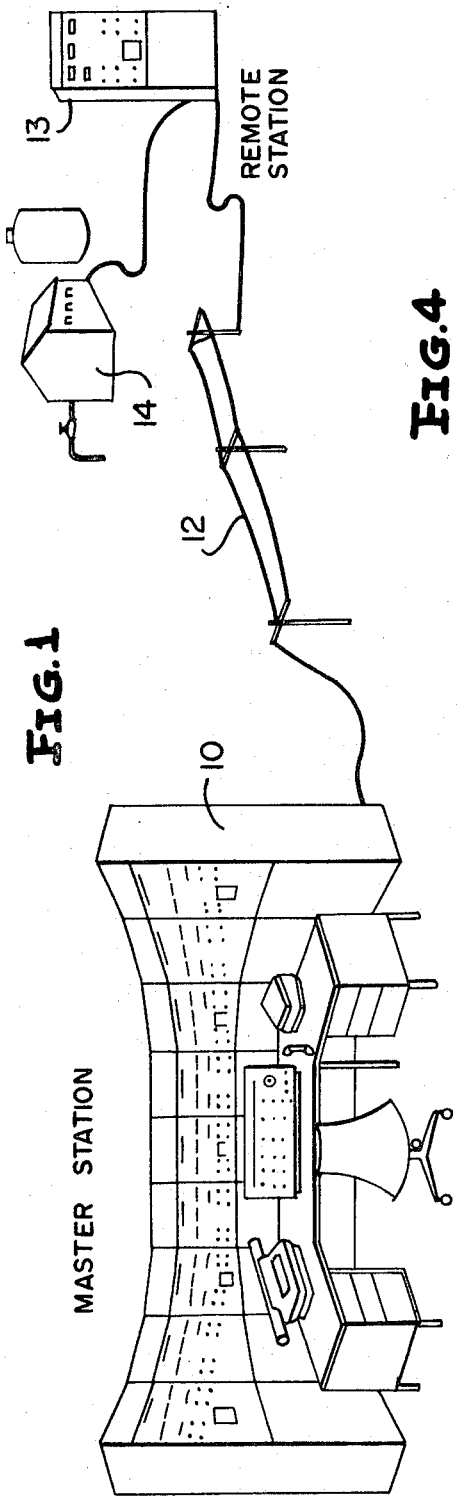
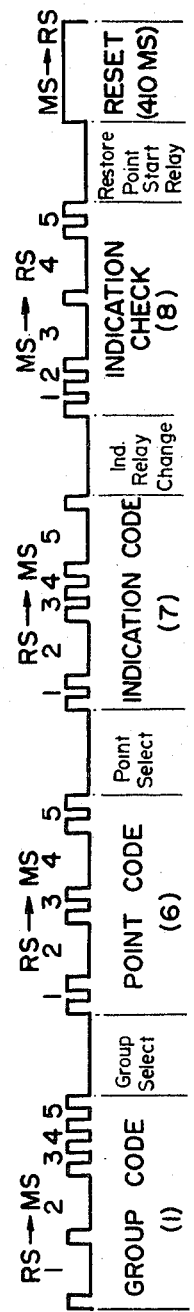
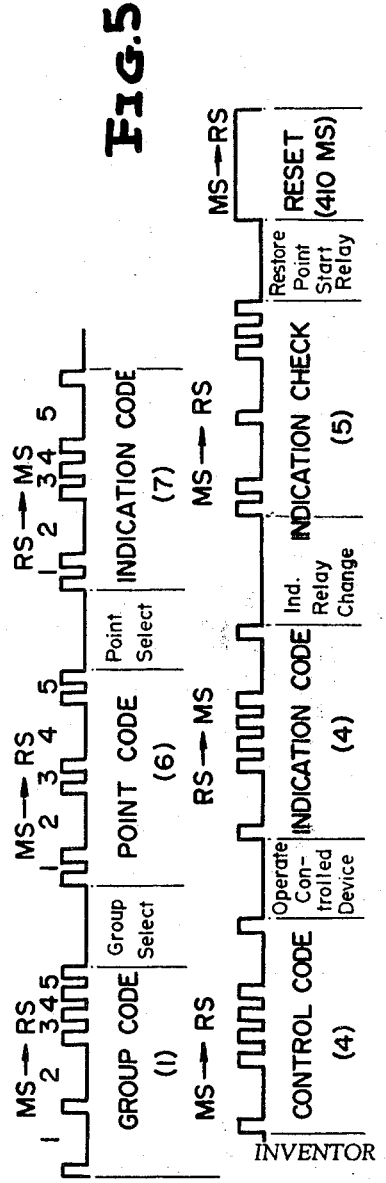
INVENTOR
LEMUEL R. BREESE
BY Hurwitz & Rose
ATTORNEYS

FIG.3

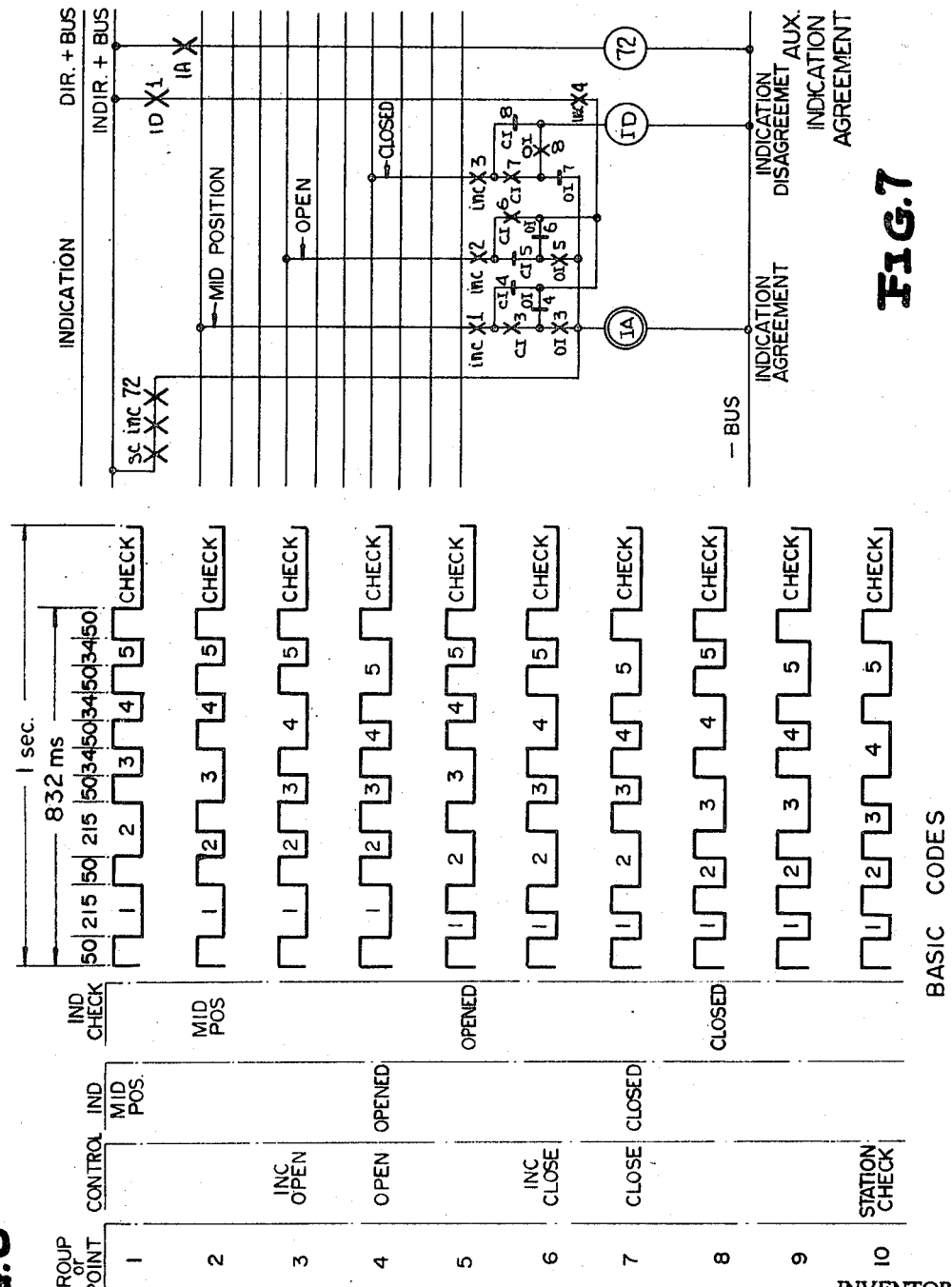

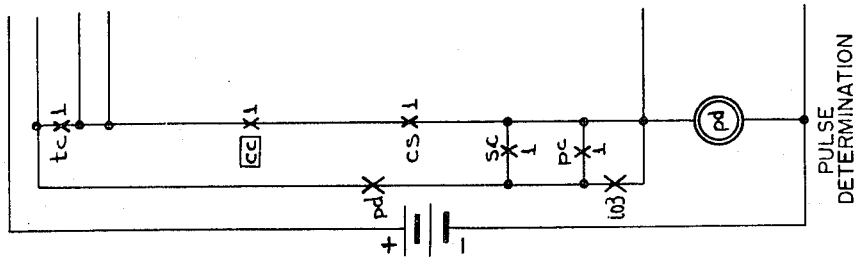
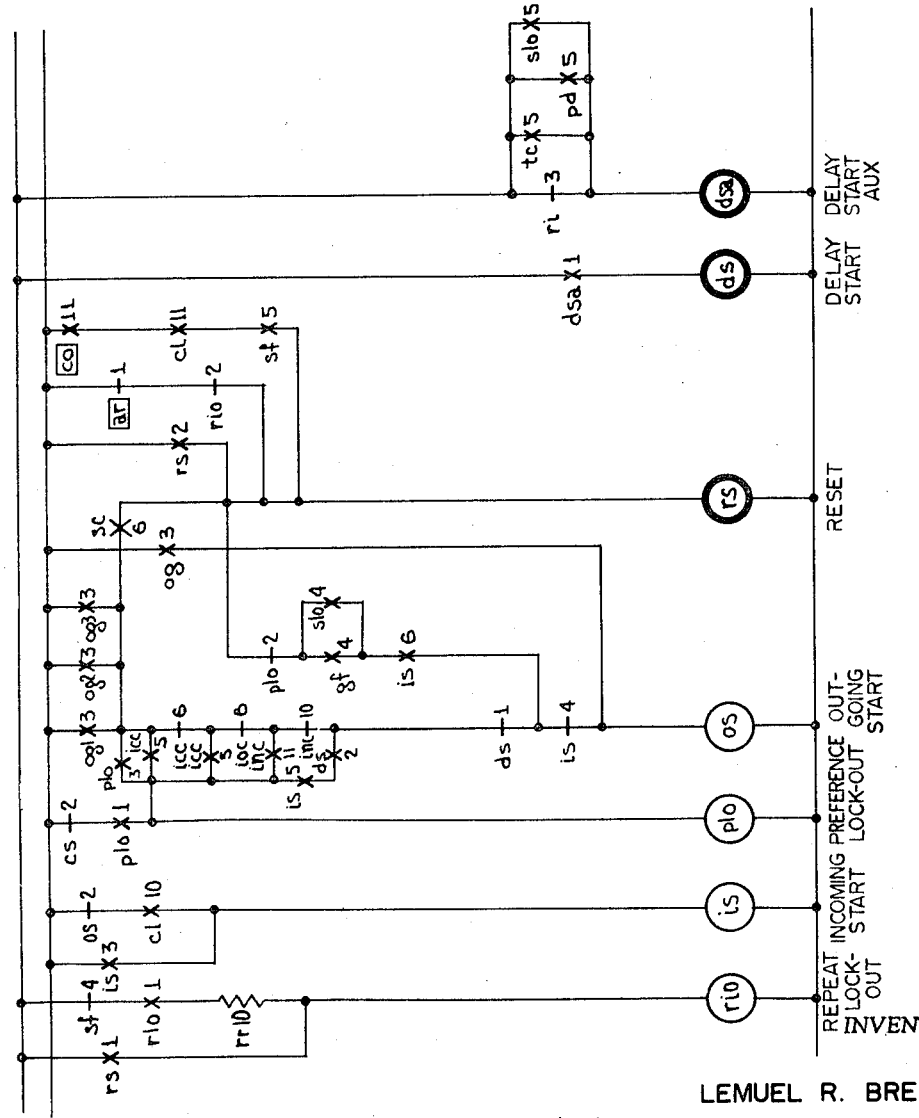

United States Patent Office 3,444,521
Patented May 13, 1969

3,444,521
SUPERVISORY CONTROL SYSTEM COMBINING SCANNING AND DIRECT SELECTION MODES OF OPERATION
Lemuel R. Breese, Melbourne, Fla., assignor to Radiation Incorporated, Melbourne, Fla., a corporation of Florida
Filed Dec. 23, 1965, Ser. No. 515,909
Int. Cl. H04q 1/02, 1/18
U.S. Cl. 340—163     24 Claims The present invention relates to a supervisory control and communication system and particularly to a supervisory control system which operates reliably in both a direct selection mode and also in a scanning mode.

Generally, supervisory control systems which have been built in the past have operated in either a scanning or a direct selection mode. Those systems operating in entirely a scanning mode, select a device by sequentially stepping through all of the devices in a particular station until the desired one is reached, after which it is possible to receive a report of a change of status or execute a command at that point. The term "point" designates a certain amount of functional equipment at the master and remote stations which is associated with a particular device at a remote station and which has a definite number assigned thereto. This type of system requires only a short interval of time for reporting the condition or status of each point and is the best method when it is desired to check many or all of the points in a remote station. However, in a large station having many points this type of system is very slow in making command selections, or reporting changes of status for individually selected points since the supervisory control system must scan sequentially the entire system, that is, all of the points in the system, in order to reach a particular point. For example, if it were desired to check or introduce a command at a point which was approximately near the end of such a sequence, the system would require that the operator wait until the desired point was reached as the system stepped through the entire sequence. With the trend towards increased and high speed automation in various industrial fields it is highly undesirable for the operator of a large complex system to wait the time necessary for the above named operation to occur. Additionally, the change of status that might occur at the remote station may be of great significance to the whole operation, requiring immediate action of the operator. Thus any amount of delay between the occurrence and the communication of that fact to the operator would be extremely undesirable. Since most of the traffic in a normal supervisory control system involves individual operations, i.e. operations at particular selected points within a station or stations, the direct selection system was developed.

In a direct selection system a device is selected by transmitting digital selection codes which select the particular station, group and point directly, thus bypassing all of the intervening numbered points that must be selected when operating in the scanning mode. This system is much more desirable for handling individual operations to selected points. However, it is extremely slow when scanning all of the points in a system, since it must repeat the station, group and point codes for each device in the station. Thus, for example, each time a new operator takes over a shift at the supervisory control station, it is desirable, generally, to maintain a complete station check of all points. This assures the new operator that each point in the system has a status which is exactly as displayed on the control panel at the master station. The necessity of repeating the group and point code for each device in the station requires an undesirably large amount of time.

Such a direct selection system is disclosed and claimed in U.S. Patent No. 3,110,013 issued Nov. 5, 1963, having the same inventorship as the present invention, and which patent is incorporated herein by reference thereto. In the direct selection system of the aforementioned patent, a complete station check, i.e., the checking of every point in every group in every station, is accomplished by transmitting from the master station the appropriate code for point one in the remote station or stations, which then transmits an appropriate code requiring each point to individually report its current status. Thus, for example, the operator at the master station first transmits a function which is particularly coded for a station check, which function first transmits the selection code for point one in group one. The remote equipment at point one then transmits the appropriate code identifying itself to the master station and indicating its present status thereto. The remote station then transmits to the master station the selection and indication codes for point two in group one and in this same manner each remote station transmits to the master station the appropriate codes idenifying itself and its present status. This operation continues to take place until each point in each group within the station to be checked has reported its status to the master station. In a large station this requires several minutes to complete. Since the status indicating devices are arranged to report the status of each remote station in a fixed sequence, if an actual status change occurs at this time on a relatively high numbered point in the station, it may be several minutes before this point is selected and the status change is reported. This is one of the most serious criticisms of the direct selection mode of operation in supervisory control systems.

By utilizing a scanning mode of operation and by maintaining the rate of scan as rapidly as possible this problem might be obviated to a certain degree. However, the utilization of such a scanning mode of operation creates the aforementioned problem of preventing the rapid selection of a particular point while omitting the points where indications or commands are not desired.

Accordingly, it is an object of the present invention to provide a supervisory control system which employs the direct selection system for routine operations and the scanning mode for a complete station check.

The system in accordance with the present invention may be utilized to select the first point in a station by direct selection. A special command code is then transmitted from the master station which switches the entire system to a scanning mode of operation. This enables the sytem to scan all of the points in the station sequentially without repeating the station, group and point codes for each point. The speed of scan may be as rapid as desired depending of course on the functions desired to be performed and the particular type of switching equipment used in the system. The scan time may thus be reduced to approximately 20% of the time that is required by direct selection operation.

The problem which was previously referred to that exists in connection with all supervisory control systems utilizing a scanning mode of operation is obviated, in accordance with another feature of the present invention, by providing for instant cancellation of the scan whenever any point not presently being scanned changes status. Immediately after cancellation of the scan, the point in the station which has just changed status reports the change by direct selection to the master station where such change is signaled to the operator thereat. Thus, the system in accordance with the present invention provides all of the advantages of both the direct selection mode of operation and the scanning mode of operation without the disadvantages of either one.

A further feature of the present invention is the use of a self-checking code or parity check which makes the scanning mode as well as the direct selection mode completely secure; such code being essentially that described in the patent referred to above.

The system in accordance with the present invention, like that disclosed in the aforementioned patent, has application in any industrial field which utilizes complex automated processes and techniques and which therefore requires a supervisory control system for providing supervision, metering, and control functions in a reliable manner, as for example, in the fields of electrical power distribution, oil and gas pipe line supply systems, hydroelectric generating plants, liquid distribution systems, production processes, conveyor systems and industrial controls generally. The application of the present system is especially adaptable to those installations where the extent of the automation has become so complete that a single man may control the distribution of the products from the point of production, through the distribution system, to the ultimate user. The system is operative to provide supervision, control sequencing, telemetering and computing operations at a great many points in the generation, distribution and supply of various commodities. These functions, as described in the aforementioned patent, are provided on both a direct selection operational mode and a systematic sequential scanning mode of operation.

It is a further feature of the present invention to provide a supervisory control system which includes protection against malfunction from all conditions including failure of the power supplies at any station, failure of the line wire, carrier channel or microwave link between the stations in the system, or interference of any kind such as voltage surges, and other electrical phenomena.

The system in accordance with the present invention usually comprises one master control center or station and one or more remote stations, usually sharing one common communication channel therewith. The system is classified or termed quiescent, in that normally a remote station will transmit only upon change of status; that is, the communication channel is not used continuously in time. Thus, the system derives optimum usage of the least expensive type of communication channel. The signal transmission is serial over a channel capable of a rate of 15 pulses per second or more. It will operate satisfactorily over virtually all transmission systems including line wire cable, telegraph circuits, phone equipment, power line carrier, and microwave channels. It will also operate over either a half duplex or full duplex channel. However, the channel must be capable of two way communication.

The present invention includes the feature provided by the system as disclosed in Patent No. 3,110,013 which includes protection means at a supervisory control station which are operative to detect the occurrence of various faults and to provide automatic reset in the event thereof.

Thus, it is another object of the present invention to provide a supervisory control system including at least a first and a second station connected over a communication channel and having a plurality of functional units divided into groups and points in a group, each group of points being assigned a different group selection code signal and each point in a group also being assigned a different point selection code signal, each code signal having a fixed number of impulses comprising marking and spacing elements and including a number of spaces of extended length, the latter consisting less than the total number of spaces in the code. The relative positions of the longer (i.e., extended length) spaces are varied to provide the different code signals and means are provided at the second station which are operative to select a point thereat only in response to the receipt of the group selection code signal and the point selection code signal which have the fixed number of pulses and the predetermined number of longer spaces at the particular positions assigned to the code for the given point, such that the system is protected against the introduction of transients or other spurious signals.

It is a further object of the present invention to provide a supervisory control system wherein a station check key is provided which when operated initiates a fast scan of the status of every point in the station. The master station transmits a two or three digit code corresponding to the lowest numbered point at the station followed by a code uniquely corresponding to the station check function. This sets up the point selection circuits in a sequential counting arrangement followed by a sequential series of point status codes reporting the status of all devices at the remote stations. Should the transmission be blocked, such as by channel noise or failure, an alarm is initiated. Any change of status at any remote station will stop the check scan operation and take precedence in transmission to the master station.

Other objects, features and advantages of the present invention will become apparent with consideration of the following detailed description of a specific embodiment thereof when taken in conjunction with the accompanying drawings, wherein:

FIGURE 1 is a pictorial diagram illustrating the system in accordance with the present invention;

Figure 3:
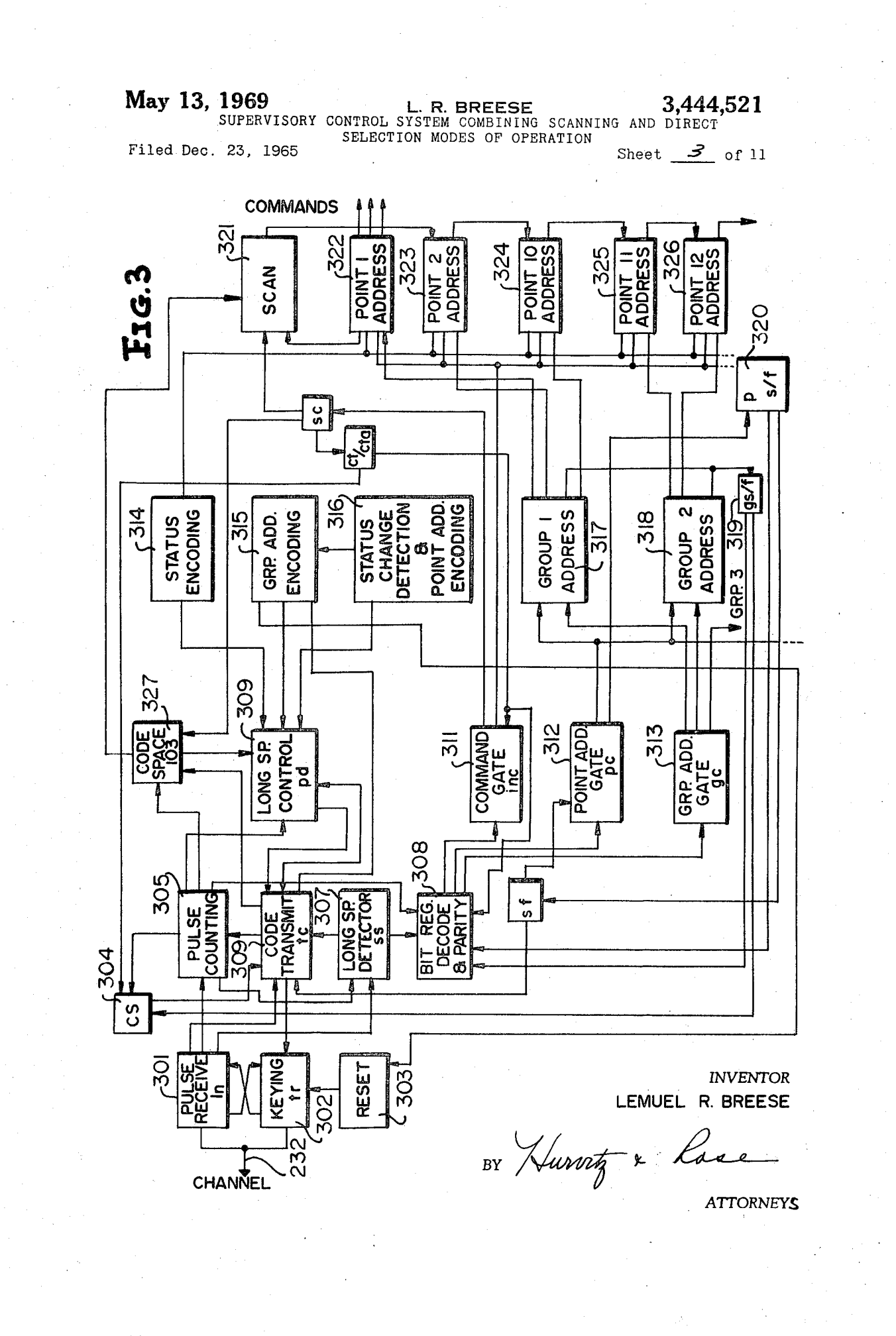

FIGURE 3 is a block diagram of a remote station in accordance with one embodiment of the present invention;

FIGURE 4 illustrates the code sequence of a typical point reporting into the master station;

FIGURE 5 illustrates the code sequence of a typical control signal initiated from the master station and transmitted to the remote station;

FIGURE 6 illustrates the basic pulse codes utilized in the present invention;

FIGURES 7 through 17 are schematic illustrations showing the detail circuitry in accordance with the present invention.

Figure 2:
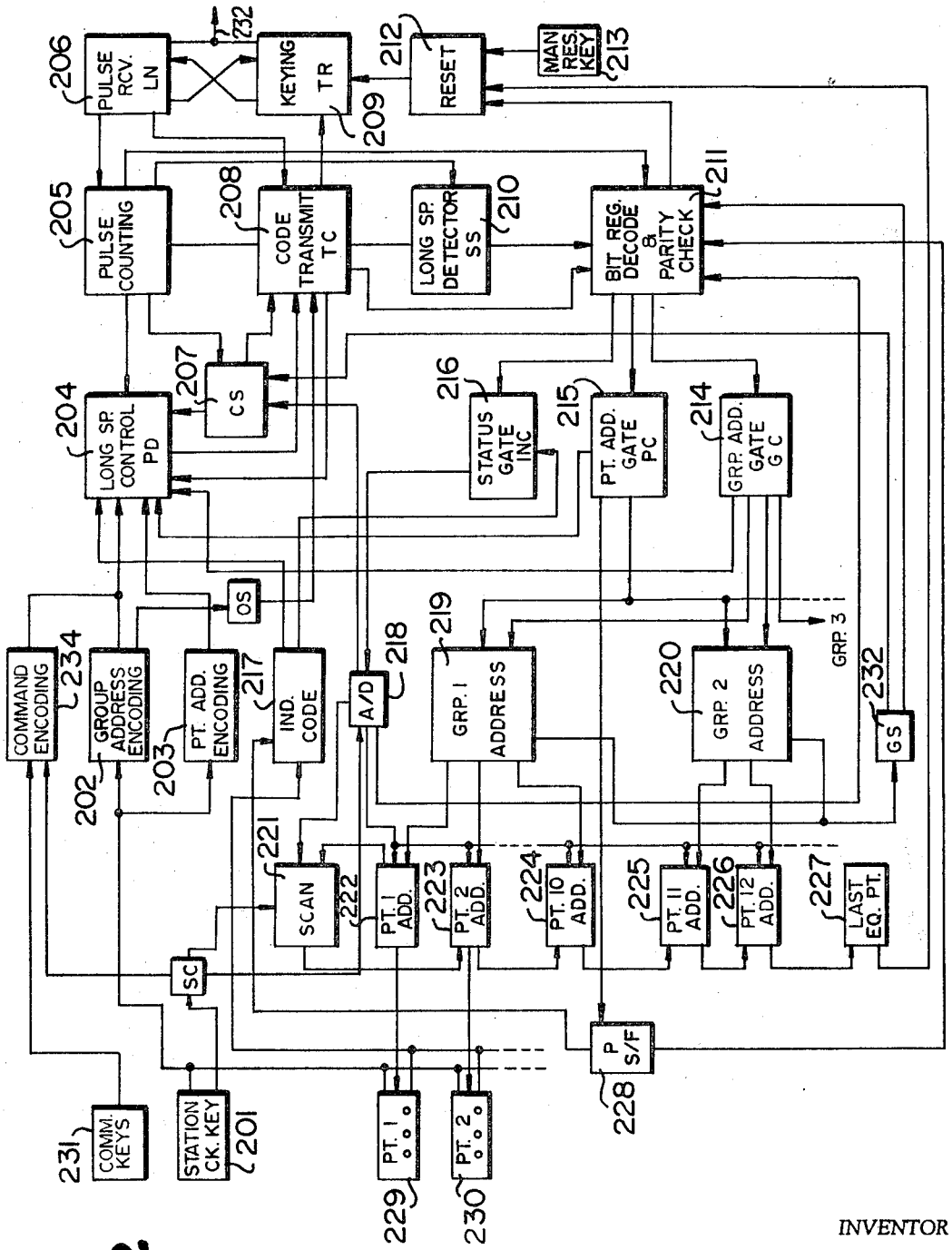
FIGURE 2 is a block diagram of the master station in accordance with one embodiment of the present invention.

Referring now particularly to FIGURE 1, there is shown the master station for the supervisory control system including the relay panels 10 and control and indication equipment for the attendant stationed thereat. The master station is connected to the communication channel which is shown as a conventional telegraph line 12. The telegraph line is then connected to the remote station 13 which may be one of several stations located in the field. Remote station 13 is connected to the equipment to be controlled at location 14, which in this case may form part of a gas distribution system, for example. Remote station 13 contains the equipment necessary to report the status of and/or supervise 100 independent points at the remote location 14. The system might also be expanded for supervision of 1000 independent points by utilizing a three digit instead of the two digit code for point selection which is utilized in the present embodiment and which code is also described in the aforementioned patent.

The particular code structure used in the present invention is made up of six pulses with five spaces therebetween in each digit. The modulation is provided by extending the length of the spaces between two pairs of pulses. These spaces of extended length are registered as pauses at the receiving station. The position of the two pauses which are inserted in each code group or digit is varied to code the desired intelligence and each code is illustrated in FIGURE 6. For example, the first code illustrated shows six pulses with five spaces therebetween as previously described. The first space and second space are of extended duration and are, for example, 215 milliseconds long, whereas spaces three, four and five are only 34 milliseconds long, which is the normal space duration. The duration of the mark portion of each pulse may be approximately 50 milliseconds as shown. The total length of time required for transmission of the six pulses then is approximately 832 milliseconds. A further extended pause is provided at the end of the fifth pulse which provides a check function, the purpose of which will be explained hereinafter. Thus, the total length of time for one code digit is approximately one second.

The first code illustrated provides the group or point selection corresponding to number one, i.e., the number one group or number one point, depending on its sequence in the code group, and also the indication function corresponding to the midposition of an operation which will also be explained in detail hereinafter.

The last illustrated code provides the group or point selection corresponding to number 10, and also to the control function corresponding to a station check. This code digit, of course, also has only six pulses with the extended spaces, or pauses, located at spaces four and five, rather than at spaces one and two as shown in the first code group. It should be noted that the code 4–5 (i.e., pauses occurring at spaces four and five) only provides the station check function and no other.

Each code group is checked at the receiving station to be certain that six and only six pulses are in each digit and that there are two and only two pauses. This self-checking feature will not permit the equipment to accept any code distorted during transmission.

In the system of the present invention the pulse codes are transmitted between the stations in a predetermined pattern according to the function to be provided. Thus, in the accomplishment of a control operation by the attendant at the control station, the master station transmits a code group and the remote station follows also by transmitting certain code groups as illustrated in FIGURES 4 and 5.

In the operation of the system, the attendant at the control station may cause the master station to interrogate the status of the equipment of point six of group one for example. This is accomplished by the control station operator depressing the group one and point six selection buttons at the master station, thus transmitting the initial portion of the code shown in FIGURE 5. The first digit is the group one selection code which has pauses inserted in the first and second spaces thereof. Then the point selection code is transmitted, for example, point six, which has, referring to the chart in FIGURE 6, pauses at spaces two and four in the pulse code group. Any one of 100 points may be selected in this manner. If this had been a 1,000 point system, another digit would have been transmitted, thus the three digits would be defined as a station selection digit, a group selection digit, and a point selection digit.

In a multiple station system every remote station except the remote station assigned by the transmitted selection code goes into a "lock-out" condition on recognition of the non-assigned code. Thereafter, no locked-out station will respond to any further transmission until a reset pulse is received. However, in accordance with one feature of the invention, a non-assigned and locked-out station can interrupt certain prior transmissions and initiate a code transmission of a change in status at a point within that station.

During the time period following the end of the sixth pulse of the point selection code six, the point select operations within the equipment take place. The remote station on receiving the group selection code and the point selection code for group one, point 6, transmits an indication code indicating the present status of the equipment at that point. In the system of the present invention, normally the numbers one, four or seven are transmitted to indicate the present position of the equipment at the selected point and also to verify that a completed communication path exists. (See, e.g., FIGURE 6, which shows that "Mid. Pos.," "Open," and "Closed" correspond to code digits 1, 4 and 7, respectively.) In this instance, as shown in FIGURE 5, the indication code seven is transmitted from the remote station to the master station to indicate that a valve, for example, at point six, is in a closed position. If there was correct code reception, a reception light (white) will verify at the master station that a completed communication path exists.

The operator at the control station upon observing the verifying white light may now depress a control switch associated with the selected point. This may be a control function which either starts or stops a particular device or performs some other function, depending on the nature of the equipment which is to be controlled. If the operator does not want to initiate any control action at this time, he can restore the system by depressing a reset button, the operation of which is explained in detail in Patent No. 3,110,013.

The system may, alternatively, be connected such that logic circuitry and/or computer equipment at the master station initiates an appropriate operation or control command at this point in the code transmission where such operation or control command is initiated automatically upon receipt at the master station of the verification code or white light indication.

As shown in the lower portion of FIGURE 5, the control code 1–5 (i.e., pauses occurring in space positions one and five) is transmitted from the master station to point six. This corresponds to a command which, for example, as shown in FIGURE 6, opens the particular valve at point six. During the time interval after the sixth pulse of the control code digit, the controlled device is operated. On the completion of such operation the remote station transmits an indication code to the master station. This indication return transmission is normally initiated by switching contacts associated with the controlled device which may be, for example, a valve having limit switches mounted thereon. Normally, the number one, four or seven is transmitted to indicate the position of the controlled device as soon as the switching contacts inform that the action requested has taken place. In this case the indication check is coded as the digit 4 which on referring to FIGURE 6 indicates that this indication check communicates the fact that the valve is open. Logic circuitry at the master station then is such that the indicating lamps change position to indicate that the present status is now opposite to that which was present prior to the transmission of the control code digit four.

Normally a two-way, or two-position point reports relatively quickly. Some three-way indications, such as a controlled delay valve movement, may require a minute or so for an operation report. In this case, the midposition indication, code digit one, is reported as soon as the device leaves the extreme position and the equipment resets. When the selected controlled device reaches the new extreme position and reports, it initiates a new transmission.

When the indication code four has been transmitted by the remote station to the master station and the indicating circuit has been activated to indicate the present status of the valve, the master station then automatically initiates another code and transmits such code to the remote station. Normally, this indication check code, as shown in FIGURE 5, is transmitted as a number two, five or eight informing the remote station of the new condition of the master station point indicating lamps. If this indication check code agrees with the remote point status circuit, that is, if there has been no change since the last transmission one second ago, the remote point start circuitry is restored to its original condition and the remote point change memory circuits are set to transmit any new status not in agreement with the master station memory. This provides for an indication of any occurrence or change of status in the controlled device which might have taken place during the time of the transmission of the prior code.

Now, the master station after transmitting the indication check code five and with the restoration of the point start circuits transmits a reset pulse which is approximately 410 milliseconds in duration. The reset pulse is longer than any normal supervisory pulse and resets the locked-out condition of all stations in a multiple station system and returns the system to its idle or quiescent condition.

Now referring to FIGURE 4, there is illustrated code sequence of transmission normally found where the remote station initiates a transmission to the master station. Upon a status change at a point, for example, point 6, which is supervised by the remote station 13 and which is not associated with a valid control operation from the master station, the appropriate remote station initiates a code transmission. First, the remote station transmits the group selection code identifying the group to the master station. The group code may be one of ten digits. As illustrated in FIGURE 4, the group code is the digit one. The equipment at the master station assimilates this group select information which is then followed by the transmission from the remote station of the point selection code digit, in this case digit six, corresponding to point six, for example. This information is also assimilated by the master station which now has received the identification of the point at the remote station which has initiated the transmission. This identifies one of 100 points. If it were a three-digit system the code would identify one of a 1,000 points.

Where the operation is in a multiple station system all remote stations must receive any remote transmission. All remotes, but the one transmitting, however, go into a lock-out condition upon receipt of the non-assigned code.

The remote station then continues transmitting an indication code which in this instance is seven, which indicates the new condition at the master station. Normally, this indication will disagree with the lamp display and cause a lamp transfer with an associated flashing of the lamps and an alarm at the master station. Upon receipt of the indication code seven, the master station transmits an indication check code eight which verifies the new condition of the indicating lamps. If the indication check code agrees with the present status of the remote point six, the point start and memories are restored. If in disagremeent, a new indication code is transmitted from the remote station. If no indication check code is received by the remote station within a reasonable period of time, the remote station initiates a completely new report transmission starting again with the group selection code. If no indication check code is received after the second attempt, the remote station goes into a lock-out condition until it receives a reset pulse. At this time it will initiate a new report.

Because the remote station is equipped with a memory, if the report of the remote point equipment is a voltage or current transient such that it causes an automatic breaker at that point to trip in a time period between the initiation of the report and receipt of the indication check code, the remote station will first report the tripped breaker and then reselect the point and report a closed breaker.

At the end of each report the master station always resets the system as shown in FIGURE 4 by the 410 millisecond reset pulse at the end of the code group.

It should be noted that on the master station indicating equipment and relay equipment shown in FIGURE 1, appropriate lamps are provided of various colors, for example, green, white and red, which indicate the status of each device at every respective point of equipment 14 connected to remote station 13. For example, when a switch associated with some point at this particular equipment location is closed a red lamp may be lighted. When the switch changes position the lamp indication at the master station automatically changes to agree. The lamp flashes and an alarm sounds until acknowledged by the operator if the change is uncommanded, i.e., if the change is initiated by the remote station without command. All two-position points, i.e., open-close, start-stop, etc., are normally equipped with additional security circuits which involve, as previously, a memory capability, such that even though a remote device momentarily shifts to its other condition and then returns to its previous condition, the master station control panel will alarm and indicate the transient.

As indicated in Patent No. 3,110,013, the system provides a three-way indication where a lighted red lamp at the master station designates one limit, a lighted green lamp designates the other limit and both lamps lighted, or extinguished, represent midposition. At the remote station two limit switches are normally required on the equipment being controlled. When the device at the remote point makes an uncommanded change, the appropriate lamp flashes and an alarm sounds until acknowledged by the control station operator.

Provision is also made in the system for DC current telemetering where the intelligence is in the form of a DC current or voltage less than the current required to pulse the main supervisory control equipment. However, the supervisory equipment can interrupt telemetering at any time to transmit a pulsing message to the system.

The system also provides pulse duration telemetering, digital telemetering and pulse rate telemetering as well as continuous control of equipment at each point such as, for example, a slow speed motor operated from contact closure, in order to change a control variable at the remote station.

Also provided in the system of the present invention is a telemeter signal which can be returned simultaneously with the transmission of the control signal to the master station. The communication to a particular point, along with the associated telemetering from the point, is released when the operator depresses the reset button or when another point interrupts with a priority transmission. The system also provides an incremental control, the code of which is shown in FIGURE 6. The transmission of the inc. control code lowers or raises a particular variable at a remote point a specific amount with each specific transmission. Telemetering can also be combined, as previously mentioned, on the same point. Audio channels may also be provided and appropriate equipment known to the art con be used to connect the telephones and interconnect them. The voice conversation can automatically be disconnected to allow a priority supervisory transmission to occur.

Should two or more points change their status simultaneously at a remote station, the lowest number point reports first; otherwise, the first point to change reports first. The priority code is wired into the logic of the system. Where the system is one having multiple stations, the highest number station takes priority. Occasionally, the system can be busy for a considerable length of time. A typical situation which is significant in accordance with the present invention is where the system is performing a system check function; that is, where the system is operating in its scanning mode. Since a remote station is in a lock-out condition after receiving a non-assigned point selection code of the status of an internal point change while the lock-out condition exists, the remote station transmits a reset pulse before the group selection code. This pulse resets the system and allows the remote station to report immediately. If the message that is interrupted happens to be a priority transmission from another remote station, both stations start a group selection code transmission at the same time. The station with the highest assigned number then reports first. If the conflict is between two points in the same station, then the lowest number point reports first.

An exception to this operation is where digital telemetering with a deviation detection feature allows a remote station to initiate transmission. Then it is possible for the digital telemetering to track a fluctuating process to the extent that it would tend to occupy the communication channel for an unduly extended period of time. This is particularly true if the digital quantities are transmitted from a higher priority station. Consequently, digital telemetering is usually subjected to a time delay which is initiated by a reset pulse of at least one point control time. The first digital quantity is telemetered immediately on change, but subsequent transmissions are then delayed to allow other reports to occur. Normally, the reports of the remote station points interrupt and take precedence over a control function. If the system is unusually busy, the master station operator can force a master station preference by holding the point selection key depressed while he pushes the master station reset key.

The construction of a specific embodiment incorporating the present invention constitutes an improvement in the specific embodiment shown and described in the aforementioned Patent No. 3,110,013 with the additional relays and switching circuitry illustrated in FIGURES 7–17. The changes, additions, and improvements in the system shown in the aforementioned patent provide a scanning mode of operation as well as a direct selection mode. This permits optimum utilization of available time in performing the station check function with the system shown in the aforementioned patent as well as gaining full advantage of the direct selection mode of operation for routine and individual commands to the discrete points of the system. Thus, the construction of the system, in accordance with the present invention, is described with reference to the basic prior system disclosed and illustrated in the aforementioned patent. FIGURES 7–17 show the modifications necessary to perform the additional functions in the achievement of the objects of the present invention.

The following table indicates the correspondence of the respective figures of the present specification with those of my prior Patent No. 3,110,013 in order to better illustrate and point out the modifications thereof. It is understood that these details of construction are disclosed solely to provide a full, clear, concise, and exact description of a specific device incorporating the present invention and that the present invention is limited only by the claims attached hereto.

| Figure of present specification: | Corresponding figure of Patent No. 3,110,013 |
|---|---|
| 7 | 12 |
| 8 | 13 |
| 9 | 17 |
| 10 | 19 |
| 11 | 23 |
| 12 | 24 |
| 13 | 25 |
| 14 | 26 |
| 15 | 28 |
| 16 | 29 |
| 17 | 20 |

In order to unambiguously indicate reference to the figures of Patent No. 3,110,013, listed in the right-hand column of the above table, the reference numerals designating such figures will hereinafter appear primed.

Figure 11:
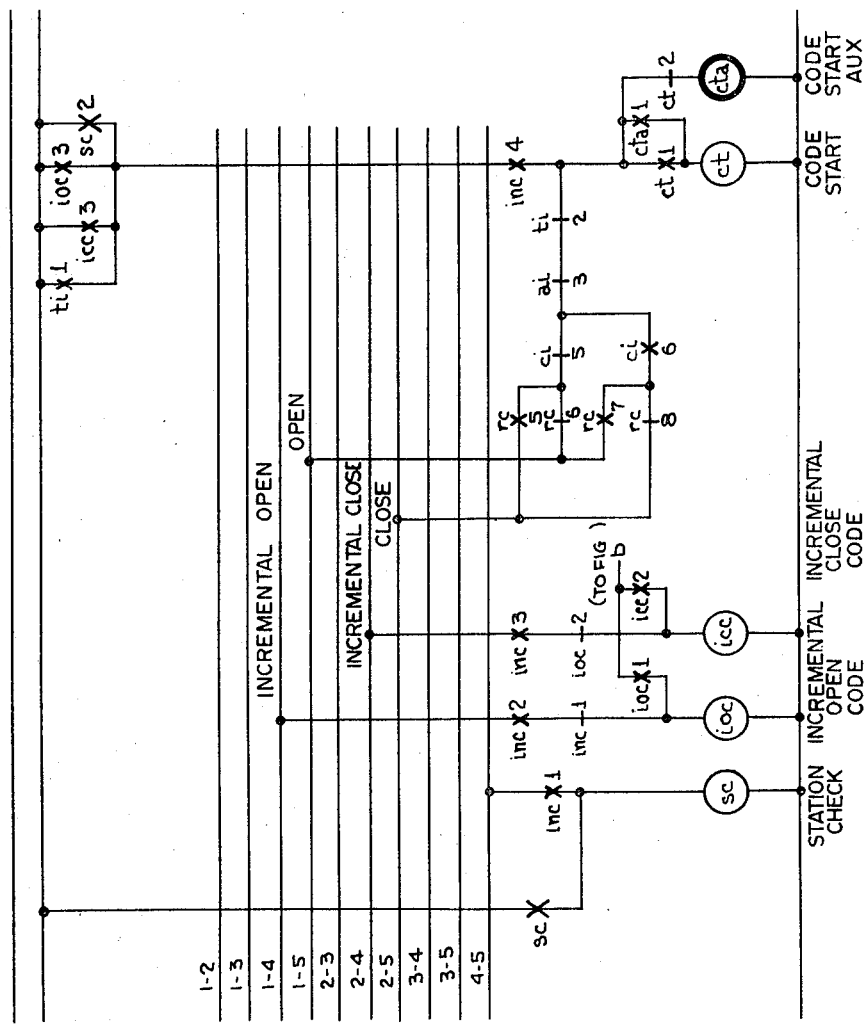
Figure 12:
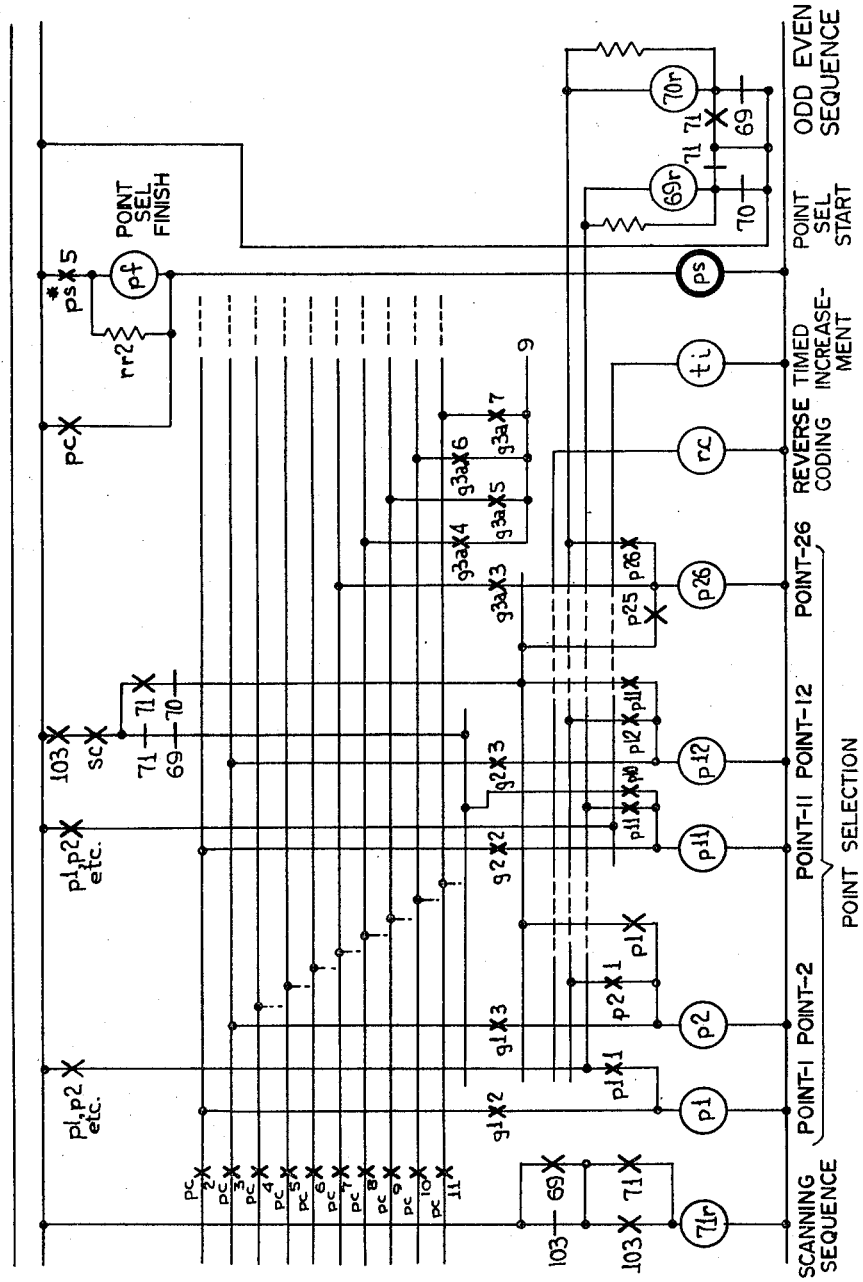

In the above table, FIGURES 7 thorugh 10, corresponding respectively to FIGURES 12′, 13′, and 19′, represent the detailed circuits of the master station 10; while FIGURES 11 through 17, corresponding respectively to FIGURES 23′, 24′, 25′, 26′, 28′, 29′, and 20′, represent the detailed circuits of a remote station 13 in accordance with the present invention.

FIGURES 2 and 3 illustrate, in the form of block diagrams, the operational and functional association of the various component parts of the master and remote stations respectively. FIGURES 7–17, when considered with the disclosure of the Patent No. 3,110,013 disclose the specific circuits, relays, and particular connections to construct an entire system in accordance with the present invention.

Generally describing the system, reference is now made to FIGURE 2 which shows, in block diagram form, the functional component parts of the master station. The system may be considered as including a line supervisory arrangement which is also operative to provide continuous telemetering of the condition of the equipment at the different remote stations and at each point thereof. However, only pulse receiving circuit 206 is shown, since the general supervisory equipment and equipment for telemetering is not necessary to the understanding of the instant invention. An arrangement is also provided for transmitting signals, including pulse counting means, for providing groups of pulses of a predetermined number in each transmission. The signals are transmitted by a keying circuit 209, and the pulse counting circuit is designated 205. Pulse coding means are provided for inserting the spaces of increased duration, i.e., pauses, at certain intervals to provide the code madulation in the transmitted impulses as illustrated in FIGURE 6. The pulse coding means includes group and point encoding circuits 202 and 203 as well as command encoding circuit 231 and indication code circuit 217. These control long space control circuit 204 which in turn controls code transmit circuit 208.

The block diagram of the remote station is illustrated in FIGURE 3 wherein a receiving circuit for receiving the impulse groups is shown as 301. A pulse counting circuit 305 is provided as well as a long space control circuit 309. Bit register decode and parity circuits 308 are responsive to the output of pulse counting circuit 305 and effect selective operations at the desired point in accordance with the received pulse codes. The gating circuits 311, 312 and 313 provide appropriate selection control means for the discrete functions received. Outputs of the point and group address gates 312 and 313 are transmitted to group address circuits 317 and 318, which are only illustrative of the group 1 and group 2 address; each group being provided with an appropriate group address circuit. An output of each address circuit 317, 318, etc. is connected to the appropriate point address circuits. For example, the group 1 address output respectively provides inputs to all of the points in group 1, i.e., points 1–10; while group 2 output provides, respectively, inputs to all of the points in group 2, i.e., points 11–20.

Transmission of signals in the system according to the invention is achieved by communication of desired control and supervisory directions between the main station and remote stations by means of coded signals as shown in FIGURE 6. Each code consists of six pulses, the mark portion of each pulse being relatively short and of equal length. The five spaces between the mark pulses contain three short and two long spaces with the long spaces arranged in different relative positions to transmit the intelligence or command to be performed. The sixth space is always long to denote that six, and only six, pulses have been transmitted. At the end of each code transmission and receipt thereof, a check circuit incorporated in circuits 211 and 308 verifies that six and only six pulses have been transmitted and that two and only two of the first five spaces were long. Thus, all of the codes contain exactly the same basic elements. If the code is mutilated during transmission, at least one of the totals will be incorrect and the equipment, detecting that an error has been made, will reject the code. The pulse receiving circuits 206, in FIGURE 2, and 301, in FIGURE 3, are connected across the line wires at each station and any supervisory control signal transmitted over the line wires operates these circuits at all of the stations simultaneously.

The signaling means for transmitting the supervisory control signals over the communication channel includes keying circuits 209 and 302, respectively, in the master and remote stations. These circuits include the transmitter relay TR or tr, which circuits will be described in more detail hereinafter. When keying circuits 209 and 303 are activated, DC voltage is applied to the line conductors feeding communication channel 232.

Each time a station is called upon to transmit pulses, a code transmit control circuit 208 or 306, is energized and the output of this circuit causes the operation of the appropriate keying circuit 209 or 302. Thus, with the control provided by code transmit circuits 208 or 306, the two required pauses can be inserted in the transmitted code by suitable control of the code transmit and keying circuits. Further, the code transmit circuits are operative to terminate the code transmission at the end of six pulses in a manner as will be described hereinafter.

The pulse receive circuits in combination with the keying circuits form self-driven multivibrators which generate the basic pulse chains. The code transmit circuit, for example, 208, controls the operation of keying circuit 209. The keying circuit 209 activates pulse receiving circuit 206 which then deactivates keying circuit 209 after a given delay. After the same time delay, the deactivation of the pulse receive circuit and the output of code transmit circuit causes the activation of the keying circuit. Thus, circuits 206 and 209 form a self-driven pulse sending combination which continues to transmit pulses over the line wires as long as code transmit circuit 208 is energized. As described in more detail hereinafter, outgoing starting circuit OS and code stopping circuit 207 as well as long space control circuit 204 control the operation of code transmit circuit 208. These circuits function to insert the long spaces, or pauses, in the transmitted code. Similar arrangements obtain in the remote, or controlled, station and will be described in more detail hereinafter.

Each time pulse receiving circuits 206 or 301 operate at any station, whether transmitting or receiving pulses, scale of six counting chains 205 and 305 operate to record the number of pulses in the code.

At the sending station, whether that is the remote station or the master station at any particular time, the pulse counter effects the insertion of the two pauses at the proper locations in the pulse chains in deriving the coded information. At the end of six pulses, the pulse receive circuit and pulse counting circuit at the receiving station operate in conjunction with long space detection circuits 210 or 307, to operate the proper stages of code register 211 or 308, respectively.

The long space detection circuits 210 and 307 are so constructed that they provide an output signal only when there is no input for a time period longer than a predetermined interval. The normal space between pulses is shorter than this interval of time, but the inserted pauses are of greater length. In the specific embodiment described herein, the long space detection circuits comprise relays SS or ss which are of the slow release type and which remain operated during the short spaces between the mark pulses of the code, but release during the receipt of a long space or pause. This, accordingly, supplies the long space location information to bit register decode and parity check 211 or 308. Each time pulse receive circuits 206 and 301 receive a pulse, whether from the line 232 or from the keying circuits 209 or 302, they cause the pulse counting circuits to step each count. Since these circuits are constructed to a scale of 6, they will step sequentially the six pulses of the code and with the receipt of the sixth pulse, the counting chain steps from its fifth step back to zero in preparation for a subsequent series of operations which will be described hereinafter. An output is taken from the pulse counter and fed to the bit register in order to reference the location of each long space with respect to each pulse position in the code.

As previously stated, the coded information or command is transmitted and communicated by inserting two long spaces in the five spaces of each code. These long spaces are inserted at the proper locations in the code by the operation of long space control circuits 204 and 309, respectively. The long space control circuits operate under the control of pulse counter 205 and code set-up circuits 202, 203, 217 and 231 at the transmitting station.

In the transmission of each group of pulses at the sending station, the long space control circuit inhibits code transmit circuit 208 or 306 to temporarily stop the transmission of pulses by the keying circuit for a given time period determined by its delay or slow release characteristic, which determines the length of the long spaces.

Control of the long space control circuit operation, in the accomplishment of the pause timing, is provided by several different circuits. At the control station, group address encoding circuit 202 sets up the logic of circuit 204 to establish the group selection code. The point address encoding circuit 203 sets up the logic of circuit 204 to establish a point selection code. Command encoding circuit 231 sets up the logic of circuit 204 to establish the control codes and indication check circuit 217 sets up the indication check codes.

At the remote station, group address encoding circuit 315 controls long space control circuit 309 to establish a group selection code. The point encoding circuit in 316 establishes the point selection codes in response to a status change at a remote point not initiated by a command and the status code for any particular point is established by encoding circuit 314. As any of these circuits operate, the outputs therefrom set the appropriate codes in the logic of long space control circuit 309 which operates to insert long spaces at the appropriate and designated locations in the code group.

In the transmission of each code digit, the long-space detector operates from the beginning of the first mark pulse and remains activated during the short spaces between the pulses. When a long space appears in the incoming code group, such long space being of such length that it is greater than the aforementioned predetermined delay time of this circuit, the long space detector at the receiving one of the stations produces an output signal. This causes one of the register stages to operate, depending on which of the counter stages is energized at this time. When pulsing is resumed, the long space detection circuit activates and an output is again provided on the next long space when the deactivation occurs for greater than the predetermined time. If the receiving station is the master station, as shown in FIGURE 2, the long space detector output is connected to an input of bit register 211. The latter is provided with a suitable decode logic circuit so as to properly locate the long spaces within the code group by reference to the counter 205 output.

The bit register circuits establish the desired gating circuits to provide the desired function, such as for example, group address, point address, or status indication.

At the end of the sixth pulse in each digit transmitted, the long space control circuit operates at the transmitting station and the long space detector circuit at the receiving station provides an input into the bit register. Where the control station is the receiving station, for example, selection control relay circuit GC, PC or INC 214, 215 and 216, associated with the previously transmitted code is operated to complete the desired selection or function. Similar arrangements obtain at the controlled stations. These selection control circuits include status gate 216, point address gate 215 and group address gate 214, all of which are responsive to the output of the bit register decode and according to the particular code transmitted, received, and recorded in the register circuits, the appropriate gate is activated.

It should be noted that the desired gating circuit, i.e., 214, 215 or 216 will be activated only if the counting circuits are operated to indicate that exactly six pulses are registered. Also, the stages and circuitry of the bit register, decode and parity check are arranged in such a way as to complete the desired selection circuit only if exactly two stages are operated. These, of course, correspond to the two long spaces that have been inserted in the code group. If the code deviates in any way from such pattern, gating circuit 214, 215, or 216 will not be completed and the equipment will automatically reset.

Reset circuits 212 and 303, respectively, are normally in an energized condition and are also constructed with a slow release or delay characteristic. Thus, these circuits remain energized during the normal pulse space time of pulse receiving circuits 206 and 301. When it is desired to reset the equipment, the circuits 212 and 303 are operated either from make contacts of manual reset key 213 or from one of the several automatic reset circuits described hereinafter and in Patent No. 3,110,013. Activation of reset circuit 212 energizes keying circuits 209 or 302 which operate relays in pulse receiving circuits 206 and 301 at all stations. Circuits 206 and 301 remain operated at all stations until the reset circuits release, disconnecting a positive voltage to de-energize all circuits which are locked to such voltage including the reset circuit itself. After a slight time delay, the reset circuits release which in turn opens the keying circuits. The latter de-energize the line wires, allowing the pulse receiving circuits to deactivate at all stations and thereby allowing the reset circuits to reoperate at each station, which sets up the proper operating potentials for the next operation.

The operation of the various keys, lamps and meters utilized in the system and operated with the various aforementioned telemetry systems and coding techniques is essentially the same as that disclosed and described in Patent No. 3,110,013 and will thus not be described in detail in this patent, except insofar as it is necessary to describe the instant invention.

In order to best illustrate the system of the present invention, such that it accomplishes the objects hereinbefore set out, the system operation in the performance of a station check function will be described.

Figure 8:
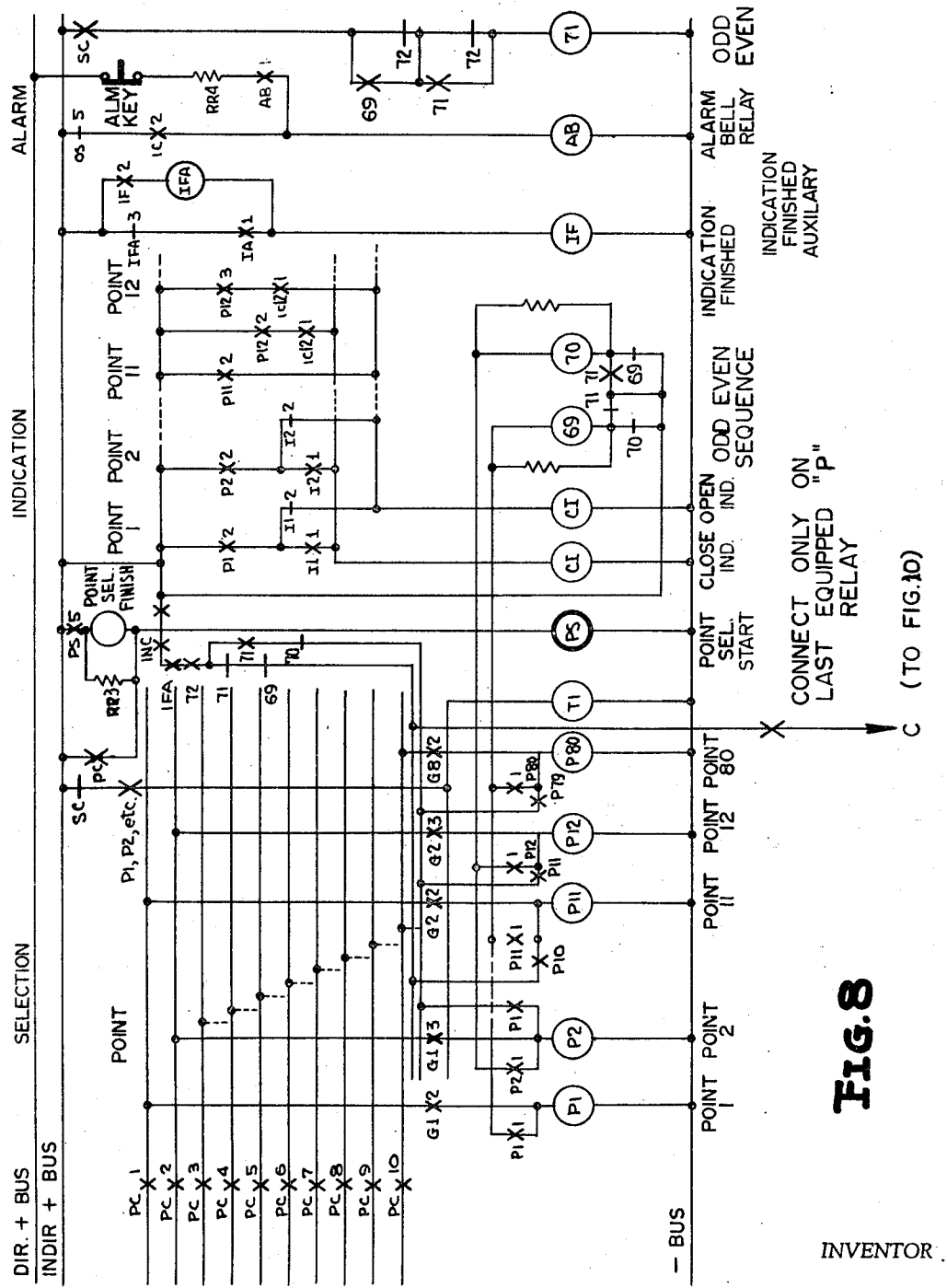

A station check is accomplished by the supervisory control system, in accordance with the present invention, with the selection of the first point in a given station and the transmission of a station check code 4–5 (FIGURE 6), which is different from any other control code. If the attendant wishes to check the status of all of the devices at every point in a station, he momentarily depresses station check key 201 (FIGURE 2; see also FIGURE 8'). After depression of a station check key, all of the points at the particular controlled station report into the control station in sequence, one after the other. However, instead of each point being selected by a direct selection mode of operation as was done in the system disclosed and described in Patent No. 3,110,013, such reporting is now accomplished by utilizing a scanning mode of operation which will be described hereinafter.

The selection of point one in a particular controlled station and thereafter the sequence of operations of the different switching sets in accomplishing an automatic reporting of the status of a circuit breaker or other functional unit at every point, will now be described.

The pattern of operation includes:

(A) Transmission of a group selection code by the control station;

(B) The transmission of a point selection code by the control station; and (C) The transmission of an indication code by the controlled station.

Figure 9:
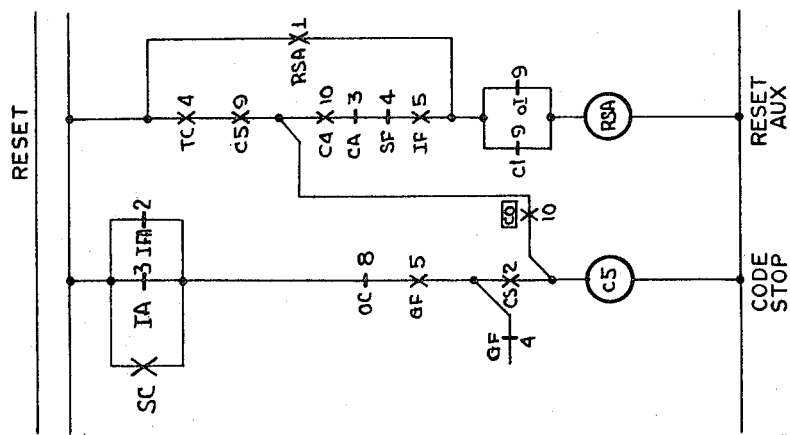

The momentary closure of the station check key 201 effects the momentary closure of three sets of switch contacts each of which is shown in FIGURES 8' and 9'. One set of contacts operates station check relay SC while another set of contacts operates group address encoding relays $GS_1$ and $GS_2$ in series, which lock to the indirect positive bus shown in FIGURE 8' and set the address encoding of 202 in FIGURE 2. Still another set of check key contacts operates relays $PS_1$ and $PS_2$ in series as shown in FIGURE 9', setting point address encoding circuit 203 of FIGURE 2.

Figure 10:
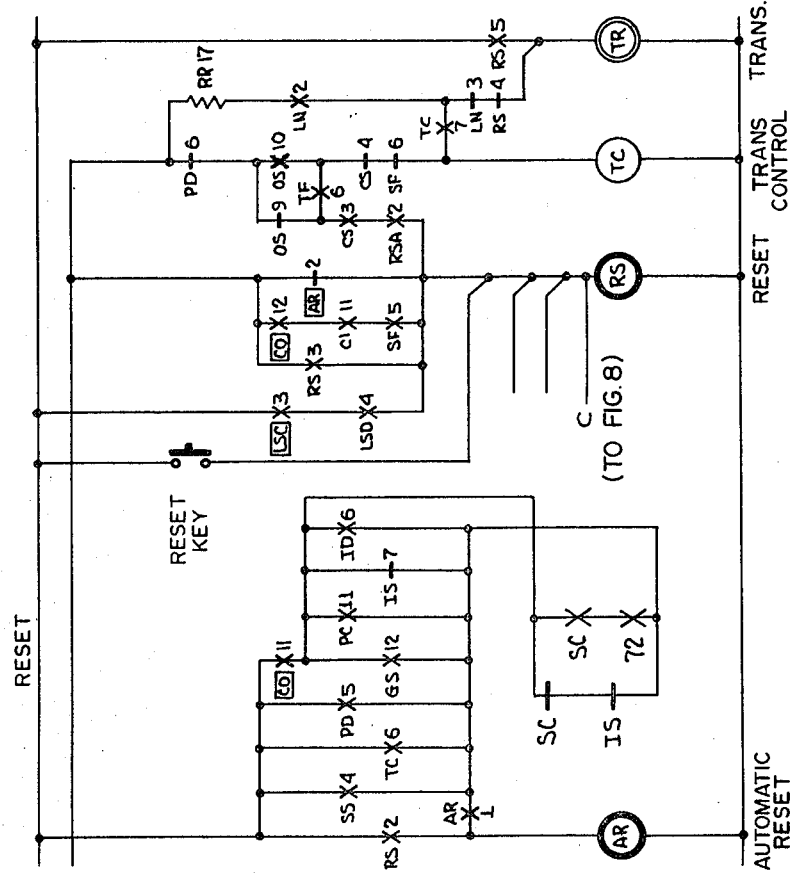

With the system at rest prior to the operation of the station check key by the attendant, the green lamp is energized on point 1, shown as 229 in FIGURE 2. As previously explained, in the system of the present invention, the points are divided into groups, each being represented by a particular pulse code and each point being represented by a particular pulse code. Thus, point 1 is the first point in the first group, and group 1 is represented by a code 1–2 and point 1 is also represented by a code 1–2. The group address encoding circuit is accordingly set with a code 1–2 as is point encoding circuit 203. With the operation of the circuits of group address encoding circuit 202, an energizing circuit is completed for outgoing start relay OS shown in FIGURE 18'. The outgoing start circuit operates to prevent additional code preparation relays from being operated should another key be depressed during the operation which has been initiated. The outgoing start relay OS operates and activates a circuit which operates code transmit circuit 208 and relay TC thereof as shown in FIGURE 10. Code transmit 208 activates keying circuit 209 which initiates the operation of the multivibrator circuit comprising the pulse receiving circuit and the keying circuit, which, as previously described, forms a self-interrupting circuit operating alternately to transmit pulses over the line conductors and channel 232 to the distant end to operate the pulse receiving circuit thereat. The pulses which are thus transmitted over line are also transmitted to counting circuit 205 at the control station which is operative to limit the number of impulses in each group to a predetermined number, which in the present example is six.

More specifically, pulse receiving circuit 206 operates and pulses counting circuit 205 and also inhibits the circuit of 209, which begins a delay period before release. The group and point address encoding circuits 202 and 203, having the appropriate relays activated for coding (the group code 1–2 and the point code 1–2), apply these voltages to the logic circuitry of long space control circuit 204. Thus, as pulse counting circuit 205 transmits the count information to long space control circuit 204, the latter responds to the first pulse count to inhibit code transmit circuit 208 to generate a long space. Code transmit circuit 208, in turn, inhibits keying circuit 209 and after a predetermined delay deactivates pulse receive circuit 206. The long space control circuit opens the original operating circuit for code transmit circuit 208. However, this circuit is held operated by pulse receive circuit 206 until same releases. Since keying circuit 209 has a slow release characteristic, it opens circuit of line relay LN in pulse receiving circuit 206. Thus, since code transmit circuit 208 is now unactivated and since pulse receive circuit 206 is not activated, keying circuit 209 remains in an unenergized condition. Pulse counting circuit 205 activates the appropriate stage of bit register 211 to prepare for the recording of the first long space in the code. The release of code transmit circuit 208 opens the circuit of the long space control which releases after a specified delay interval as determined by its slow to release characteristic. The slow release period of the long space control is the main factor in establishing the pause after the first pulse. After the specified delay, circuit 204 activates code transmit circuit 208 which, in turn, activates keying circuit 209. This initiates pulse receive circuit 206 in a manner of the previous cycle to initiate transmission of the second pulse.

During the mark period of the second pulse, the pulse receive circuit operates and steps pulse counting circuit 205 to its second step, and also inhibits the circuit of relay TR in keying circuit 209 in the manner previously described.

In that the group selection code for point 1 is 1–2, the second space of the pulse group must also be of increased duration, which duration is now effected by reason of the operated condition of the relay circuits in group address encoding circuit 202. The pulse counting circuit 205 activates long space control circuit 204. After a predetermined delay, the latter opens the circuit of code transmit circuit 208. After the expiration of the slow release period, keying circuit 209 releases and in turn releases the pulse receive circuit which releases the code transmit circuit and counting chain relays in pulse counting circuit 205. The counter 205 then steps to the next count which operates the second stage of bit register 211 to indicate the transmission of the second pulse. The code transmit circuit 208 starts long space control circuit 204 going through its slow release period. After circuit 204 has released, code transmit 208 is operated in turn reoperating keying circuit 209 which in turn reoperates pulse receive circuit 206 in the manner of the previous description to begin the make period of the third pulse following the second pause. This operation continues until keying circuit 209 and pulse receive circuit 206 initiate the beginning of the sixth pulse.

Since the system is arranged to transmit six pulses in each code digit, which six pulses are now registered on the counting relays, a stop signal is generated for the multivibrator circuit of 209 and 206. More specifically, with counting stages zero and five both operated as a result of the sixth pulse, a circuit is now completed to operate code stop relay CS in circuit 207 which holds open the circuit of the transmitting control relay TC in code transmit circuit 208. As keying circuit 209 presently releases according to its slow release characteristic, the operating circuit for relay LN and pulse receive circuit 206 is opened to end the mark portion of the sixth pulse.

The system now registers the fact that the group code has been received, registered and marked. The code transmit circuit 208 in its release completes a circuit to operate group code relay (GC) 214. Relay GC in the group address gate 214 operates and establishes a temporary holding circuit for pause determination relay PD in long space control circuit 204 and also completes a circuit to operate the group 1 selection relay in group 1 address circuit 219. The group selection relay $G_1$ operates to apply a positive voltage which activates group selection start relay (GS) in circuit 232. Relay GS releases register relays $R_1$ and $R_2$ which coded the group in bit register decode circuit 211 and also releases code stop circuit CS 207. When relays $R_1$ and $R_2$ in the register are restored, they operate relay GC in circuit of group address gate 214 which gates off group 1 address 219 and group selection start relay 232. However, relay 232 now operates in series with relay $G_1$ in the group 1 address 219 to hold the same operated in preparation for the transmission of the point selection code. The GS relay circuit also prepares a holding circuit for code stop circuit 207 which will also be effective during the point selection code to follow.

Release of relay GC in group address gate 214 is effective to open holding circuit for long space control relay PD which on release, according to its slow release characteristic, determines the interval between the group selection code and the point code.

Referring now to the operations which are transpiring at the controlled station as a result of the receipt of the group selection code, it should be recalled that relay ln in pulse receive circuit 301 is operated and released with the relay LN at the control station to register the code of the desired group and point on the equipment thereat. As relay ln operates, it is effective to complete a circuit which pulses the counting chain relays in pulse counting circuit 305. These pulses initiate the operation of long space detector 307 which, because of the slow release characteristic of relay ss, remains activated during the normal space portions between the pulses.

At the end of the mark portion of the first pulse, relay ln releases which releases first step of pulse counter 305. After an interval as determined by its slow release characteristic, relay ss in the long space detector circuit 307 operates and in turn operates the first code register relay $r_1$ in bit register 308.

It should be noted that the long pause received during the space period of the first pulse permitted the release of long space detector relay ss and operation of register relay $r_1$ to thereby register the first pause in the group selection code, digit one.

When the channel again transmits a pulse from the main station, line relay ln in pulse receive circuit 301 again operates, in turn operating relay ss in long space detector circuit 307 and also the second stage of the counting chain in pulse counter 305. When the space portion after the second pulse appears, the pulse receive circuit releases the first step of the pulse counter and also opens the circuit of relay ss in long space detector 307 which, because of the pause which is received during the second space period, signals and operates register relay $r_2$ in bit register 308. On the mark portion of the third pulse, the pulse receive relay again operates and in turn steps the pulse counter to the third count and energizes relay ss in long space detector circuit 307 once again.

When the space portion of the third pulse appears, pulse receive circuit 301 causes the release of line relay ln which in turn releases the third stage of pulse counter 305. However, in this case, since the space period is not of an extended duration, relay ss in long space detector circuit 307 is not released and no registration is made on register 308. This operation continues with each successive pulse until the completion of the sixth pulse.

At the end of the mark portion of the sixth pulse a long intercode space portion, which was caused by the delayed release of long space control 204 at the end of the sixth pulse in the transmission thereof, releases relay ss in long space detector 307. After relay ss releases according to its slow release characteristic, a circuit is completed which operates group address gate 313 and relay gc located therein. The appropriate logic circuitry included in the bit register decode operates the gc relay in group address gate 313, which in turn, energizes the particular group address relays, in this instance, the group 1 address relays in circuit 317. When the appropriate group 1 address relays operate, they are operative to apply positive potential to relay gs which is the group selection start relay in circuit 319. Relay gs operates to restore register relays $r_1$ and $r_2$. These relays, when restored, release group address gate 313 which cuts off the original operating potential for the group 1 address relays in circuit 317. The relay gs in circuit 319 operates in series with relays $G_1$ and $G_{1a}$ in the group 1 address to mark the fact that the group selection has been completed and prepares a holding circuit for the code register relays and the code stop relay cs which is effective as the next code is received.

Thus, the group selection code has been generated, transmitted and registered on the equipment at both control and controlled stations.

As previously indicated, a long pause is inserted after the transmission of the group selection code by the control station and thereafter a point selection code is transmitted to select the desired point. In that the point selection in the present example is point 1 which is represented by a code 1-2, the operation of the station check key resulted in the operation of point selection relays PS1 and PS2 in combination to mark this code in point address encoding circuit 203 of FIGURE 2. This, as previously mentioned, controls the insertion of the pauses in the first and second spaces of the 6 pulse code digit transmission for point selection through long space control circuit 204.

At the control station, the release of the relay GC in group address gate 214 opens the holding circuit of relay PD in long space control circuit 204. After a time interval, as determined by its slow to release characteristic, this relay releases, which in turn, reestablishes the circuit for transmitting control relay TC in the code transmit circuit 208. Code transmit circuit 208 then energizes keying circuit 209 which begins operating together with the line relay in pulse receive circuit 206 to form the multi-vibrator producing self generating pulsations on channel 232. Since point address encoding circuit 203 has activated therein point selection relays PS1 and PS2, as shown in FIGURE 9' there is an insertion of long spaces in the spaces associated with the first and second pulses of the point selection code. The pause determination relay PD in long space control circuit 204 will thus be operated and released on the first pulse and it will also be operated and released on the second pulse for the purpose of providing these two long spaces. The sequence of operations of the point selection relays and pause determination relay in long space control circuit 204 is essentially the same as that already described for the group selection code in as much as the group selection code in the present example is 1-2 and the point selection code is also 1-2. However, the operating circuits for code transmit circuit 208, including relay TC, are different as will now be shown.

At the end of the 6th pulse, as relay LN in pulse receive circuit 206 at the control station releases, the relay TC in code transmit circuit 208 releases. Also, at this time the fifth stage of pulse counting circuit 205 releases as before. As relay TC releases, the circuit of relay PD in 204 is opened and rely PD begins its slow release.

Relay GS in circuit 232 which operated at the end of the group selection code and which was connected to the circuit of GS through bit register decode circuitry 211 is transferred to the circuit of point address gate PC 215. Point address gate relay PC operates to close a circuit for point 1 selection relay P1 in point 1 address circuit 222. Relay P1 in point 1 address 222 operates to lock up in series with sequence relay 69 and point relay P2 locks up in series with sequence relay 70 as shown in FIGURE 8. The sequence relays 69 and 70 form part of scanning circuit 221 as shown in FIGURE 2. The point address gate relay PC now also activates point selection start relay PS (FIGURE 8) which prepares an amplitude metering circuit M, not shown herein but disclosed in FIGURE 19 of Patent No. 3,110,013. The condition of the closed indication relay CI or open indication relay OI in the indication circuit 217 is determined by the previous condition of the circuit breaker at the remote point. The operation of relay PS releases register relay R1 and R2 which, in restoring, opens the circuit of relay PC in point address gate 215, thus gating off the point 1 address. On release of relay PC, its energizing circuit in long space control circuit 204 is opened, initiating the beginning of the release period of the relay. The release of relay PD does not reoperate transmission control relay TC in code transmit circuit 208 as at the end of the group selection code, since code stop relay CS is restored and prevents this operation from taking place.

With relay TC unenergized the control station awaits the receipt of a signal from the controlled station That is, the control station has transmitted the group selection code 1-2 and the point selection code 1-2 to effect selection of point 1 at the control station and must now await the receipt of an indication code which indicates to the control station the nature of the selection codes received.

Now the controlled station equipment responds to the point selection code which was just transmitted by the control station by effecting operation of point selection relay $p1$ in the point 1 address circuit 322.

More specifically, when relay $ln$ releases in the pulse receive circuit at the controlled station at the end of the 6th pulse, the opening of this relay releases the 5th stage of counter 305 and opens the circuit of slow release selection start relay $ss$ in long space detector 307. This releases, after an interval as determined by its slow to release characteristic. When relay $ss$ is released, a circuit is completed to operate point code relay $pc'$ in point address gate 312. Since register relays $r1$ and $r2$ are operated in response to the receipt of the point selection code 1-2, a circuit is completed to operate the point selection relay $p1$ in the point 1 address circuit 322. Relay $p1$ operates in this circuit and locks up in series with odd-even sequencing relay 69 in scanning circuit 321. The point address gate relay $pc$ activates slow operate point selection start relay $ps$ (FIGURES 12 and 15) which connects the metering source to the transmitter T in preparation for amplitude metering on the point 1 (not shown herein, but the same as that shown in FIGURE 30 of Patent No. 3,110,013).

With the operation of relay $ps$, which places another relay $pf$ in series in the same circuit 320, relay $pf$ is shunted until the original operating circuit of relay $ps$ is removed as shown in FIGURE 12. This releases the register relays and selection finish relay $sf$, the latter in turn releasing relay $pc$.

At this time the controlled station equipment is in condition to initiate the transmission of the indication code. The selection finish relay $sf$ releases which completes the circuit to operate the transmitting control relay $tc$. Relay $tc$ operates relay $tr$ which in turn operates relay $ln$ in pulse receive circuit 301. The keying circuit 302, of course, also operates pulse receive circuit 206 in the master control station. Accordingly, the line relays at the controlled and control stations operate and the first mark portion of the first pulse of the indication code is generated.

Assuming, of course, that the circuit breaker on point 1 at the controlled station is in an open position, the controlled station transmits the open indication code comprising a series of six pulses having extended spaces associated with the first and the fifth pulse as shown in FIGURE 6. As previously indicated, the activation of pulse receive circuit 301 by keying circuit 302 forms a multivibrator action which pulses pulse counting circuit 305. As the long spaces in the open indication occur on the first and fifth pulses, circuits for operating relay $pd$ in long space control circuit 309 will be established during the mark portions of these pulses. A closed indication relay $ci$ is operated in status encoding circuit 314 and is restored if the circuit breaker is in the open position. Accordingly, with the breaker found open and relay $ci$ released during the mark portion of the first pulse, circuit 316 operates relay $pd$ in long space control circuit 309. Thus, with relay $pd$ operated during the mark portion of the first pulse, the equipment will produce a long space during the generation of the following space period. That is, when relay $tr$ in keying circuit 302 releases, line relay $ln$ opens the circuit of relay $tc$ to release the same. When relay $tc$ releases, the circuit of slow to release relay $pd$ is opened and relay $pd$ releases after a given time interval. The slow release interval of relay $pd$ is the main factor in producing the long space in the space portion of the first pulse.

Relay $pd$ releases and completes a circuit to operate transmitting control relay $tc$ which in turn operates transmitting relay $tr$. The operation of relay $tr$ operates energizing circuits for relay *ln* and LN at the controlled and control stations, respectively, with the mark portion of the second pulse. The operation of *ln* at the controlled station effects the operation of the second counting chain relay in the pulse counter and releases transmitting relay *tr*, which releases after a time interval in turn releasing relay *ln* and LN to end the mark period and begin the space period of the second pulse. With relay *ln* released, the short space following the second mark period is initiated. The release of *ln* reoperates relay *tr* and releases counting chain relay *tc*. Thus, *tr*, in keying circuit 302, begins the mark portion of the third pulse and pulse counting circuit 305 responds to the pulse receive circuit 301 in a similar manner as previously described.

On the transmission of the fifth pulse of the multivibrator, the counting chain steps to five and opens the circuit for relay *tr* which goes through its slow release period. Since the open code indication digit requires a long space at this time, relay *pd* is operated during the mark portion of the fifth pulse by status encoding circuit 314. Relay *tr* releases slowly and in turn releases relays *ln* and LN to terminate the mark portion of the fifth pulse and begins the space portion. The release of relay *ln* effects the release of the counter chain stage and the release of the transmitting control relay *tc*. When relay *tc* releases, it opens the circuit of relay *pd* and this relay begins its slow release period to insert a long space in the space portion of the fifth pulse. Relay *pd* in its release reoperates transmitting control relay *tc* which in turn operates transmitting relay *tr*, the latter in turn operating line relays *ln* and LN to terminate the long space associated with the fifth pulse and initiate the mark portion of the sixth pulse.

When six pulses have been transmitted the equipment is now operated to initiate termination of the transmission of the code pulse group. This is accomplished when the relay stage of pulse counter 305 corresponding to zero or the end of the sixth pulse operates and completes a circuit for code stop relay *cs* in circuits 304, which operates to prevent any further transmission of codes from the controlled station until the receipt of further information from the control station. As the relay *pd* releases the transmitting control relay *tc* is prevented from reoperating by the open contacts of the code stop relay *cs* as shown in FIGURE 3. Thus, the controlled station ceases its transmitting operation and awaits a further operation at the control station.

At the control station, relay LN in pulse receive circuit 206 is responsive to the receipt of the pulses of the open indication code to effect the marking of this incoming code in the operation of the indication agreement relay IA or the indication disagreement relays ID as the code indicates. These relay circuits are represented by the block 218.

More specifically, as the pulse receive circuit 206 operates at the control station it operates the counting chain relay of pulse counting circuit 205. With relay TC in code transmit circuit 208 and pause determination relay PD in long space control circuit 204 non-operated, a circuit is completed which operates selection start relay SS in long space detection circuit 210.

At the end of the receipt of the mark portion of the first pulse, pulse receive circuit 206 releases the first stage of the counting chain and in turn opens the circuit of selection start relay *ss*. The long space transmitted from the control station allows the start selection relay SS to release and when this occurs at the end of its slow release period a circuit is completed to operate register R1 which is the first stage of bit register decode 211.

When the line relay of pulse receive circuit 206 reoperates at the beginning of the mark period of the second pulse, a circuit is completed to operate or step the second stage of counting chain 205 and to reoperate relay *ss* in preparation for the next long space. This operation continues for each pulse of the indication code until at the end of the mark period for the fifth pulse and the beginning of the long space of the fifth pulse line relay LN in pulse receive circuit 206 releases, which in turn releases the fourth stage of the pulse counting circuit and which also opens the circuit of slow release start selection relay *ss* which begins its slow release after the predetermined long space is transmitted from the control station. This allows relay *ss* to go through its slow release period and causes the operation of register relay R-5 in bit register 211.

At the beginning of the mark portion of the sixth pulse, the pulse receive circuit 206 reoperates, in turn, operating the start selection relay *ss* in long space detector 210 and activating the counting chain relay in pulse counting circuit 205.

At the end of the mark portion of the sixth pulse the line relay in pulse receive circuit 206 releases to begin the intercode space interval and the counting chain relay in the fifth stage releases and opens the circuit of start selection relay SS. As a long space is transmitted by the controlled station, long space detector 210 has time to release and in turn operates incoming code relay INC in status gate circuit 216 through the register and decode circuit 211.

It should be noted at this point that bit register decode circuitry 211 provided for the shift from relay GC in group address gate 214 to point address gate 215 and now shifts to status gate 216. Since the last-noted position of the breaker at point 1 was the open position, close indication relay CI which is part of indication circuit 217 is in the released condition and the open indication relay OI is in the operated condition. Thus, with the contacts of relays R1 and R5 operated, that is with the code 1-5 set into the bit register 211, open indication code 1-5 (assuming that the indication at point 1 is to be an open indication) is received and the operation of the status gate 216 effects the operation of indication agreement relay IA in the circuit illustrated as A/D 218. The operation of this circuit indicates whether or not the incoming indication code agrees or disagrees with the last indicated or remembered condition of the device. As previously indicated, before the controlled station sends the indication code, to provide the means for comparison, indication check code circuit 217 was operated to register the last condition of the device. In this case circuit 218 will indicate agreement and will signal a white selection lamp at point 1 through point address circuit 222. Thus, this provides an indication that the point has been registered. Additional circuitry, not shown in FIGURE 2, restores register relays R1 and R5 in bit register 211, and code stop relay CS in circuit 207 is held operated to prevent the control station from sending an indication check code immediately following the first indication received.

If the closed indication code 2-5 (FIGURE 6) had been received from the controlled station, register relays R2 and R5 in bit register decode 211 would have been operated and the indication disagreement relay ID, as shown in FIGURE 7, would have operated in circuit 218. This would have extinguished the green lamp on point 1 and energized the red lamp at that point.

In the reporting of the equipment at certain of the points the controlled station, as previously mentioned, may send a mid-position indication code 1-2 (FIGURE 6) to indicate, for example, that a valve is neither completely open nor completely closed but is at some mid-position. With the receipt of the mid-position code 1-2 a circuit is completed which activates circuit 218 to indicate the agreement or disagreement thereof. Thus, an acccrate report of the condition of the equipment at each point at the controlled station and any variation from a previously reported condition is accurately provided at the master control station for the attendant to observe.

As shown in FIGURE 2, the circuit 217 then signals to 204 that the indication code has been completed.

The command circuit 234, which is responsive to the Station Check Key 201 through switching circuit SC and which also feeds 204, then causes the transmission of a command code of 4–5 corresponding to the station check function (FIGURE 6), which operates station check relay sc at the remote station through the command gate 311 which is opened by the register and decode 308 on receipt of the station check code, as shown in FIGURE 3. Relay sc operates the code start relays ct and cta which deactivate code stop circuit 304. Deactivation of the code stop circuit starts the remote station sending the indication code for point 1 again. However, the station check relay sc switches code stopping circuit over to code space circuit 327 which has a delay characteristic and thus, at the end of each indication code transmission, circuit 327 operates to insert a long space between the codes and also to step scanning circuit 321 to the next point in sequence so that the status of this next point will be transmitted on the next code transmission of the remote station. This operation continues until the status of all of the points have been transmitted.

At the master station, the station check relay circuit SC prevents indication agreement circuit 218 from deactivating code stop circuit 207 when each indication code is registered while at the same time, indication agreement circuit 218 operates after the completion of each indication code is registered and steps scan circuit 221 to each successive point address circuit 222 through 227 so that the next indication code will be recorded on the next successive point.

When the indication code is registered on the last equipped point 227, a circuit is completed to operate reset circuit 212 which restores the system to the normal quiescent standby condition.

In order to achieve the scannning station check function, in accordance with the present invention, the circuit and relay connections as disclosed in the prior Patent No. 3,110,013 have been modified to the extent described hereinafter.

As previously stated, the P point selection relays at the master station in point address circuits 222 through 227 and the p point selection relays at the remote station in the point address circuits are arranged to operate as an odd-even counting chain in conjunction with scanning circuits 221 and 321.

In particular, sequence relays 69, 70 and 71 have been added to provide the counting chain scanning feature as shown in FIGURES 8 and 12. The character r appearing after the numerals 69, 70 and 71 in FIGURE 12 merely designates that these particular relays are located at the remote station as distinguished from relays 69, 70 and 71 located at the master station. Relay 72 which is also added at the master station merely provides more switching contacts for the indication agreement relay IA of circuit 218 (FIGURE 2) and as such, is designated the auxiliary indication agreement relay as shown in FIGURE 7.

Figure 13:
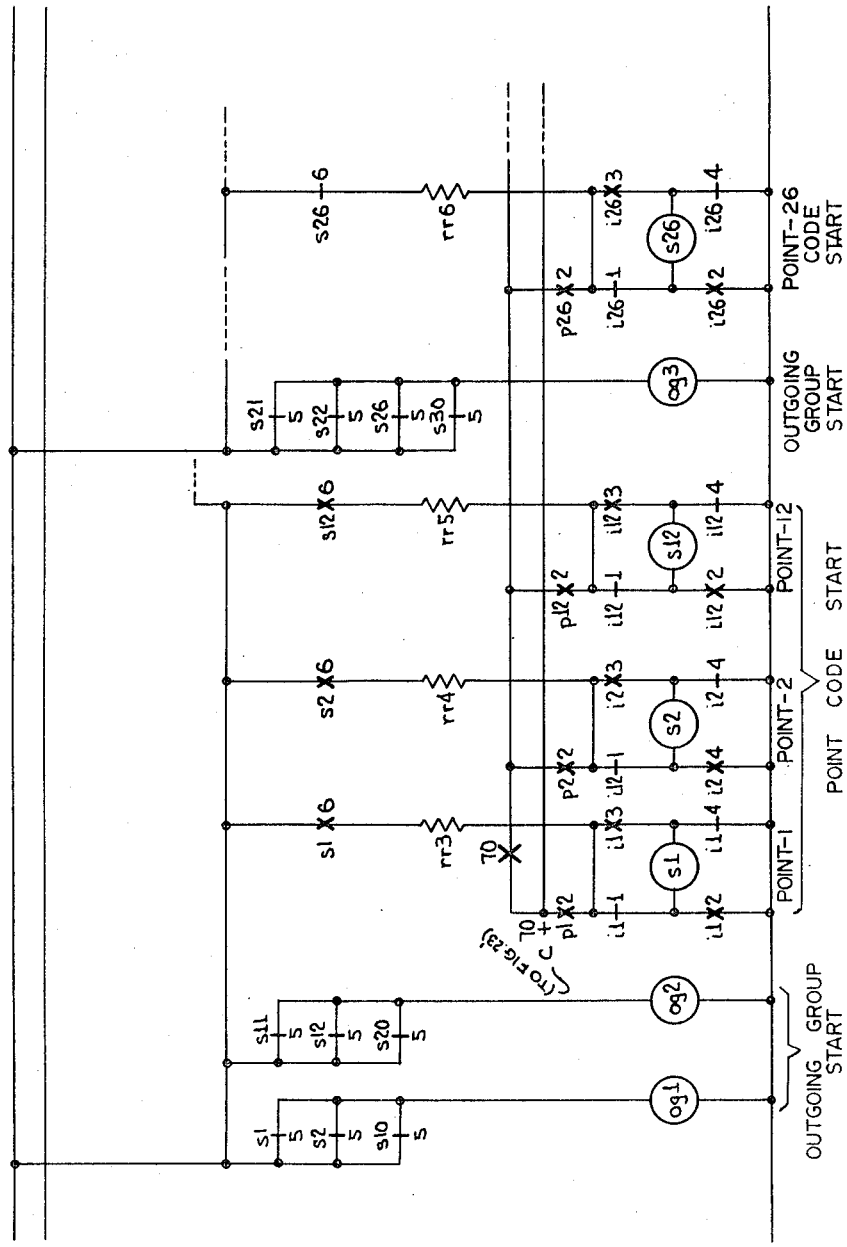

With reference to FIGURE 13, the holding circuit to each "s" point code start relay (circuit 316 in FIGURE 3) at the remote station (s21, s22, etc.) is connected to the direct positive battery bus instead of the break contact of the station check (sc) relay as was shown in FIGURE 25'. Thus, operation of the station check relay does not release all of the "s" relays.

The station check relay at the master station is activated by the station check key as shown in FIGURE 8'. The uppermost contacts of the "check 1" key for example, operates the station check relay SC over a path which extends from the indirect positive bus over contacts OS–2, station 1 check key contacts, the winding of relay SC to the negative bus. Relay SC is activated and locks through its make contacts SC–4. As previously described, the closing of the check key results in the selection of point 1 followed by the transmission of the indication code by the remote station.

On the completion of the indication code, the indication finished relay IF operates (FIGURE 8) and releases the selection finish relay SF (FIGURE 16') and the operated register relays (FIGURE 17') to light the white selection lamp at point 1 at the master control station. The relay IF also closes a circuit to operate the open code relay OC (FIGURE 10') over the circuit extending from the indirect positive bus, contacts OS–4, 1F1, CA–1, IFA–1, SC–7, and the winding of relay OC to the negative bus. Relay OC operates the mode auxiliary relay CA and locks through its make contacts OC–1.

The release of relay SF and the register relays effects the release of relays INC (FIGURE 17') and IA (FIGURES 12' and 7), and the release of relay IA operates relay IFA (FIGURE 8) which opens the original energizing circuit of relay OC which remains locked. The operation of relay OC causes the opening of contacts OC–8 (FIGURE 17'), releasing the code stop relay CS (FIGURE 9), which closes contacts CS–4, thereby operating the transmitting control relay TC (FIGURE 10).

The master station then transmits the command code 4–5, for the station check function. The contacts 8 and 9 of station check relay SC (FIGURE 11') perform the logic to operate relay PD on and only on the fourth and fifth pulses. The circuit for operating relay PD on the mark portion of the fourth pulse extends from the indirect positive bus over contacts TC–1, GS–5, PS–4, OC–6, SC–9, C4–1, C3–2, and the winding of relay PD to the negative bus. The circuit for operating relay PD on the mark portion of the fifth pulse extends from the indirect positive bus over contacts TC–1, GS–2, PS–2, OC–7, ICC–2, ICC–4, C5–2, C4–2, and the winding of relay PD to the negative bus.

When the 4–5 command code is received at the remote station, register relays r4 and r5 will be operated. At the end of the mark portion of the sixth pulse, relay ln releases, in turn, operating relay C5 (FIGURE 27') and opening the circuit of relay ss (FIGURE 27') which goes through its slow release. When relay ss has released, relay inc (FIGURE 15) is activated over the circuit path which extends from the indirect positive bus over contacts ss–2, sf–3, co–8, rl–4, r2–6, r3–7, r4–8, r5–6, gf–3, pf–2, and the winding of relay inc to the negative bus. When relay inc operates with register relays r4 and r5 operated, a circuit is completed to operate station check relay sc over the path which extends from the indirect positive bus over contacts rl–2, r2–4, r3–6, r4–7, r5–4, inc–1, and the winding of relay sc to the negative bus. The make contacts of sc lock this relay to the indirect bus as shown in FIGURE 11.

The relay sc at its contacts sc–2 (FIGURE 11) activates status code start relay cta over the path which extends from the indirect positive bus, contacts sc–2, inc–4, ct–2, and the winding of relay cta to the negative bus. Relay cta closes its countacts cta–1, operating relay ct which locks over contacts ct–1, inc–4, and sc–2 to the indirect positive bus. Relay ct opens its contacts ct–2 which opens the circuit of relay cta which goes through its slow release period. Relay cta releases to open its contacts cta–2 (FIGURE 15) releasing register relays r4 and r5, and relays sf and cs. The release of relays r4, and sf effects the release of relay inc which releases relay ct at contacts inc–4.

The release of relay cs closes a circuit to relay tc (FIGURE 30) at the break contacts cs–4. Activation of relay tc starts the multivibrator action of relays tr and ln which transmit the remote station indication code corresponding to the status of point 1.

Figure 15:
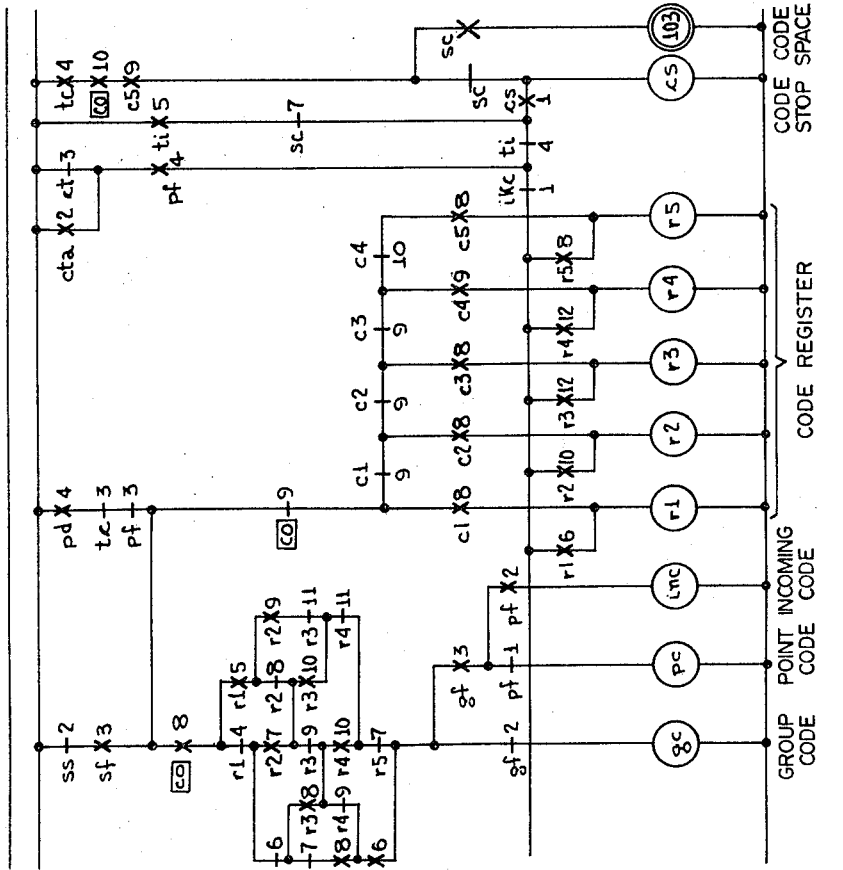

At the completion of the indication code transmission, pulse counter relays co and c5 are activated and relay sc, of course, is still activated due to the lock circuit shown in FIGURE 11. Code space relay 103 operates through the make contacts tc–4, make contacts co–10, make contacts c5–9, make contacts of sc, and the coil of 103 to the negative bus as shown in FIGURE 15.

The break contacts of sc (transfer contacts) open the circuit of the code stop relay cs.

As shown in FIGURE 17, the make contacts of code space relay 103 provide a holding circuit for the pause determination relay pd to insert the required extra long space at the end of each code transmission since both relays 103 and pd are of the slow release type.

The operation of relay 103 activates relay 71r through a make contact of relay 69r as shown in FIGURE 12. When relay 71 is operated, it closes a circuit which operates relay p2 over the path extending from the indirect positive, make contacts of relay 103, make contacts of relay sc, make contacts of relay 71r, break contacts of relay 70r, make contacts of p1, the coil of p2 to the negative bus.

Relay p2 operates and establishes a holding circuit through make contacts p2–1 to the coil of relay 70r.

When relay 103 releases according to its slow release characteristic, relay 70r operates in series with relay p2, holding relay p2 in an activated condition. The operation of relay 70r releases relays 69r and p1 at break contacts of relay 70r as shown in FIGURE 12.

The remote station now sends the indication code for point 2, after which it steps to point 3, etc.

At the master station the receipt of the indication code for point 1 causes relay INC to be operated in the normal manner which records the received status on point 1. Relay IA operates to indicate that the code has been registered and as it does so it also operates its auxiliary relay 72 shown in FIGURE 7. The make contact of SC shown in FIGURE 9 bridges the 3 break contact of IA so that the break of IA does not cause the release of relay CS as it would on a normal point selection. The break contact of relay 72 releases the relay SF shown in FIGURE 16', releases relays R–1 to R–5 in the bit register shown as 211 in FIGURE 2 and FIGURE 12', and the incoming code relay INC shown in FIGURE 17'. Thus, these relays are ready for the next code transmission.

Referring now to FIGURE 8, the odd-even sequence relay 71 is operated by a make contact of relay 72 through a make contact of 69. The operation of relay 71 operates relay P2 from the indirect positive voltage through a make contact of SC, a make contact of INC, a make contact of the indication finished auxiliary relay IFA, and a make contact of 72, a make contact of 71, the break contact of 70, the make contact of P1, to the coil of P2. When relays IA and 72 release, relay 70 operates in series with P2 and releases relays 69 and P1 at a break contact of relay 70. This completes the recording of the status of point 1 and prepares the master station to record the status of point 2 at the end of the next code. This series of operations continues through all of the points in the system. As the status code is registered on the last point, the circuit at the terminal which would normally be connected to the next point is connected instead to the coil of relay SC to reset the system. This is shown in FIGURE 8 where it is labeled as such and an arrow indicates C to be connected to the circuit in FIGURE 10, which as shown in FIGURE 10, completes the circuit for the reset relay RS.

Figure 14:
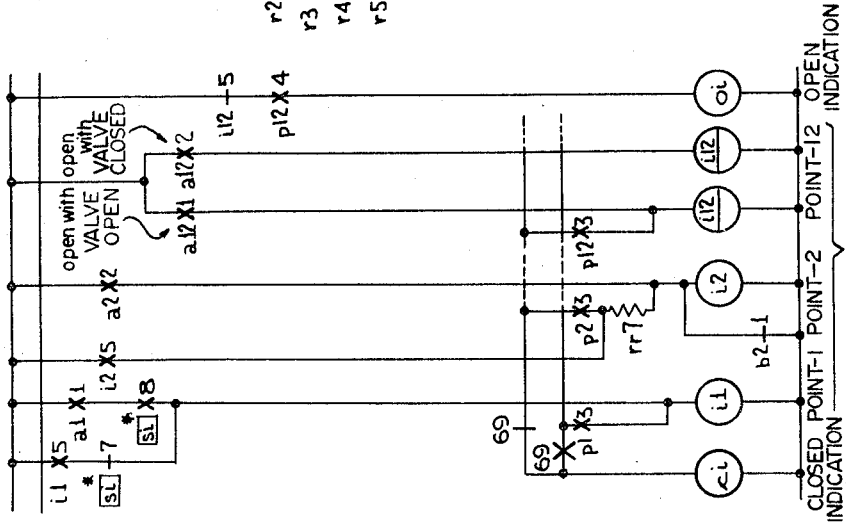

The point code start circuits and the point indication circuits shown in FIGURES 13 and 14, respectively, and contained in the Status Change Detection and Point Address Encoding circuit block 316 of FIGURE 3, are locked out of operation during the scanning function since, of course, it is not necessary to transmit the group and point selection codes for each point in that mode. However, should a status change occur at any point other than that being scanned, the appropriate i switches activate the particular s relay associated with that point. Since there are ten "s" relays associated with each outgoing group start relay, activation of, for example, s2, would also activate og1 in the Group Address Encoding circuit block 315 of FIGURE 3 to set up the appropriate logic of the long space control circuit (FIGURES 20' and 21') to provide the proper group and point selection codes.

The operation of relay og1 closes contacts og1–3 in the outgoing start circuit of FIGURE 16. However, since the incoming start relay is was activated with the first scan command and locked through is–3, contacts is–4 in the outgoing start relay circuit remains open. This prevents the relay os from operating and transfers the positive voltage from the indirect positive bus through og1–3 to the coil of reset relay rs. This initiates the reset function and cancels the scan.

After the reset mark pluse has been transmitted, the incoming start relay is is released, and since contacts og1–3 and is–4 are closed, relay os is activated, closing contacts os–5 (FIGURE 30'). The transmitter control relay tc is thus activated which initiates the transmission of the generated pulse train of multivibrator relays tr and ln. The group and point selection codes for point 2, having been set into the logic of the long space control circuit, cause the long spaces, or pauses, to be inserted at the appropriate locations in the pulse train. The indication code is transmitted in the same manner as previously described.

All of the codes involved are self-checking in that if any invalid codes are received at the master station the system will reset and cancel the scan. If an invalid code is transmitted and received at the master station the parity circuits will not complete the code and therefore, the selection finish relay SF will not be activated. As such, the reset circuit shown in FIGURE 10 will respond to reset the system in the manner explained in detail in the prior Patent No. 3,110,013.

The automatic reset relay circuit of FIGURE 19' has been modified as shown in FIGURE 10 wherein the relay AR is pulsed with the operation of various other relays in the station. However, relay AR does not release because of its inherent slow release characteristics. Two sets of additional contacts are disposed in parallel in the AR operating circuit, namely, a break contact of SC in series with a break contact of IS and a make contact of SC in series with a make contact of 72.

The remaining function and features of the apparatus are substantially the same as that disclosed in my aforementioned prior patent, and as such are not repeated, but are incorporated herein by reference thereto.

Although the system is disclosed as being constructed with electromagnetic relays, other switching devices, such as vacuum tubes or semiconductor devices, could also be used.

I claim:
1. In a supervisory control system,
   a plurality of stations connected over a communication channel;
   a plurality of functional units divided into points, each of said points having a different code signal assigned thereto;
   signal generator means at each station for generating a basic signal and control means thereat for modulating said basic signal;
   first circuit means for activating said control means for initiating a code signal deriving a communication path to a given one of said points from one of said stations to another of said stations;
   second circuit means for activating said control means for initiating a code signal deriving the sequential scanning of the status of each of the functional units at each of said points;
   means at one point at said another station operative in response to a change in status of a functional unit thereat to cancel said sequential scanning and automatically energize said control means and said signal generator means to transmit a code signal identifying said point and the status thereof to said one station.

2. In a supervisory control system according to claim 1 wherein said first circuit means comprises group address and point address encoding means, logic means responsive to said encoding means whereby said control means modulates the transmitted signal from said one to another station with said assigned code corresponding to said point.

3. In a supervisory control system according to claim 1 wherein said second circuit means comprises command encoding means, logic means responsive to said encoding means whereby said control means modulates the transmitted signal with an assigned code corresponding to a station check function; indicating means at said one station associated with each of said points; a first counting chain means at said one station for sequentially stepping said system from said indicating means associated with said given point through each point of said another station.

4. In a supervisory control system according to claim 3, receiving means at said another station responsive to said transmitted signals for establishing a second counting chain means at said another station for sequentially stepping said system from said given point through each point of said another station.

5. In a supervisory control system according to claim 1, said second circuit means comprising means for encoding the appropriate code for a predetermined one of said points and command encoding means for setting the appropriate command code to perform a station check function, logic means responsive to said encoding means for causing said control means to modulate the basic signal of said generator means to produce the code signal corresponding to said predetermined one of said points; means for receiving said code signal at said another station deriving a communication path to said predetermined point address; and means responsive to said code signal for establishing a circuit connection between said address and first means for sequentially scanning other point addresses in said another station.

6. In a supervisory control system according to claim 5, status encoding means at said another station responsive to the condition of the functional unit at said predetermined point; means responsive to said status encoding means for generating an indiciation code signal to indicate said condition; means for receiving said indication code signal at said one station including display means therefor, and means responsive to the completion of said indication code signal for causing said logic means to actuate said signal generator and control means for transmitting the station check code signal to said another station.

7. In a supervisory control system according to claim 6, switching means at said another station responsive to the station check code signal for stepping said sequential scanning means to be in circuit connection with the next point address, and means for initiating the signal generator means and control means at said another station to transmit an indication code signal indicating the condition of the functional unit at said next sequential point; means responsive to said next indication code signal at said one station for signaling the completion thereof, and means responsive thereto for stepping second scanning means at said one station to be in circuit connection with display means corresponding to said next point.

8. In a supervisory control system according to claim 7, means responsive to receipt of an indication code signal indicating the condition of the functional unit at the last sequential point of said first scanning means for restoring said system to its normal quiescent condition.

9. In a supervisory control system according to claim 1, said second circuit means comprising point encoding means, command encoding means, and control and logic means responsive to said point and command encoding means for first modulating the transmitted signal from said signal generator means at said one station with an assigned code corresponding to a predetermined point address, and then modulating the transmitted signal with an assigned code corresponding to a station check function, status indicating means at said one station associated with each of said points, a first scanning means at said one station for sequentially stepping the system from the indicating means associated with said predetermined point through each point of said another station, and receiving means at said another station responsive to the transmitted signals for actuating a second scanning means for sequentially stepping the system from said predetermined point through each point at said another station in synchronism with said first scanning means whereby the status indication of every point at said another station is received at said one station without the transmission therefrom of code signals corresponding to every such point address.

10. In a supervisory control system according to claim 9, said code signals comprising a given number of mark and space elements having a fixed number of spaced elements less than the total thereof which are of different duration than the others, the positions of said space elements of different duration within said given number of mark elements constituting the modulating indicia of said code signals.

11. In a supervisory control system according to claim 10, said receiving means comprising counting means for counting each mark element, detecting means for detecting each space element of different duration, and register means responsive to said counting and detecting means for decoding and storing the information of each code signal, gating means responsive to the decoded information signal of said register means for establishing an appropriate communication path in accordance with said information.

12. In a supervisory control system according to claim 11, said gating means comprising a point address gate responsive to said predetermined point address signal for deriving a communication path to a point address circuit at said another station corresponding to said predetermined point; status encoding means at said another station responsive to the condition at the point for which an information path has been established, means responsive to said status encoding means at said another station for transmitting an indication code to said one station, and means at said one station for indicating whether the condition at that point has changed since its previous interrogation.

13. A supervisory control system according to claim 12, wherein said means responsive to said status encoding means initiates the signal generator means at said another station to begin transmission of mark and space elements, and wherein said control means at said another station, being responsive to said status encoding means provides the space elements of different duration corresponding to the condition at that point.

14. A supervisory control system according to claim 12 wherein said means at said one station for indicating a changed condition comprises counting means for counting each mark element, detector means for detecting each space element of different duration, register means responsive to the counting and detecting means for storing and decoding and incoming indication information, gating means responsive to said information for transmitting said information to a comparison circuit comprising means for storing an indication of the previous condition at that point, said comparison circuit providing an output to said status indicating means associated with that point, and code stopping means responsive to the completion of the status indicating code for inhibiting any transmission from said one station thereafter.

15. In a supervisory control system acocrding to claim 11, said gating means comprising a command gate responsive to receipt of said station check code in said register means for actuating switching circuit means for stepping said second scanning means to be in circuit relation with the address of the next successive point, and said switching circuit means then initiating the transmission of the indication code correspondng to the condition at said next successive point.

16. A supervisory control system according to claim 15 further comprising code space circuit means responsive to said switching circuit means for providing a space element between indication code transmissions having a duration which is unequal to that of said space elements of different duration as well as being unequal to the space elements of normal duration.

17. In a supervisory control system according to claim 1, said second circuit means being activated into operation at will.

18. A supervisory control system according to claim 1, wherein said last stated means comprises first switching means responsive to a change in status of a functional unit located at said another station corresponding to one point thereof without said change being initiated by a command, second switching means responsive to said first switching means for actuating reset circuit means which cancels the sequential scanning of said second circuit means, logic means responsive to said first switching means for encoding the proper point identifying code, and means for actuating said signal generator and control means responsive to said logic means for transmitting said code to said one station.

19. In a supervisory control system, a plurality of stations coupled over a communication channel; a plurality of functional units divided into points, each of said points having a different code signal assigned thereto; signal generator means at each station for generating a basic signal and control means thereat for modulating the basic signal; means at one of said stations for automatically checking the status of the functional unit at each point of another of said stations comprising circuit means at said one station for activating said control means for initiating a first code signal deriving a communication path to a predetermined point at said another station by direct selection, means at said another station responsive to the status of the predetermined point for transmitting an indication code signal to said one station, indicating means at said one station responsive to said indication code signal for indicating the status of the predetermined point, means at said one station responsive to the completion of said indication code signal for initiating a second code signal which steps a first scanning circuit at said another station, said first scanning circuit initiating the transmission of an indication code indicating the status of the next successive point, means at said one station responsive to receipt of the indication code corresponding to said next point for stepping a second scanning circuit providing said next point status indication on the indicating means associated with that point, whereby the status of each point is indicated at said one station without transmisson of code signals addressed to each point.

20. A supervisory control system according to claim 19 further comprising means at said another station operative in response to a change in status of a functional unit thereat to cancel said sequential scanning and automatically energize said control means and said signal generator means to transmit a code signal identifying said point and the status thereof to said one station.

21. A supervisory control system according to claim 19 further comprising means at said one station for indicating on receipt of each indication code signal whether the point corresponding therewith has changed its status since previous interrogation.

22. A supervisory control system according to claim 10 further comprising means for registering said given number of mark and space elements for determining their propriety and means for resetting said system in the event of their impropriety.

23. In a supervisory control system, a plurality of stations connected over a communication channel; a plurality of functional units divided into points, each of said points having a different code signal assigned thereto; means at one of said stations for automatically checking the status of the functional unit at each point of another of said stations, said means comprising means for direct selection transmission of a code signal corresponding to a predetermined point and means for then sequentially scanning the status of the other points of said another station.

24. A supervisory control system according to claim 23 further comprising means responsive to a change of status of a point not at that time being interrogated by said scanning means for resetting said system and reporting said status change to said one station.

References Cited

UNITED STATES PATENTS 3,133,267  5/1964  White _____ 340—147
3,323,107  5/1967  Du Vall _____ 340—163 XR DONALD J. YUSKO, *Primary Examiner.*